(12) United States Patent
Kerfoot

(10) Patent No.: US 8,771,507 B2
(45) Date of Patent: Jul. 8, 2014

(54) DIRECTIONAL MICROPOROUS DIFFUSER AND DIRECTIONAL SPARGING

(75) Inventor: William B. Kerfoot, Falmouth, MA (US)

(73) Assignee: ThinkVillage-Kerfoot, LLC, Boulder, CO (US)

( * ) Notice: Subject to any disclaimer, the term of this patent is extended or adjusted under 35 U.S.C. 154(b) by 252 days.

(21) Appl. No.: 12/534,662

(22) Filed: Aug. 3, 2009

(65) Prior Publication Data
US 2009/0304449 A1  Dec. 10, 2009

Related U.S. Application Data

(60) Continuation-in-part of application No. 11/272,446, filed on Nov. 10, 2005, now Pat. No. 7,569,140, and a continuation-in-part of application No. 12/177,467, filed on Jul. 22, 2008, now Pat. No. 7,648,640, which is a division of application No. 10/745,939, filed on Dec. 24, 2003, now Pat. No. 7,401,767, application No. 12/534,662, which is a continuation-in-part of application No. 11/485,080, filed on Jul. 12, 2006, now Pat. No. 7,621,696, and a continuation-in-part of application No. 11/485,223, filed on Jul. 12, 2006, now Pat. No. 7,651,611.

(51) Int. Cl.
  *B09C 1/02* (2006.01)
  *B09C 1/08* (2006.01)
(52) U.S. Cl.
  USPC .................. 210/220; 261/122.1; 261/123
(58) Field of Classification Search
  USPC ............. 210/747.7, 747.8, 752, 198.1, 220; 261/122.1, DIG. 42, DIG. 70, 123
  See application file for complete search history.

(56) References Cited

U.S. PATENT DOCUMENTS

| | | |
|---|---|---|
| 1,920,719 A | 8/1933 | Stich |
| 2,517,525 A | 8/1950 | Cummings |
| 2,845,185 A | 7/1958 | Winderweedle, Jr. |
| 2,946,446 A | 7/1960 | Herbert |
| 3,027,009 A | 3/1962 | Price |
| 3,206,178 A | 9/1965 | Lamb |
| 3,219,520 A | 11/1965 | Box |
| 3,276,994 A | 10/1966 | Andrews |
| 3,441,216 A | 4/1969 | Good |
| 3,545,731 A | 12/1970 | McManus |
| 3,570,218 A | 3/1971 | Finney |
| 3,669,276 A | 6/1972 | Woods |
| 3,670,817 A | 6/1972 | Saucier |

(Continued)

FOREIGN PATENT DOCUMENTS

| | | |
|---|---|---|
| DE | 3805200 | 9/1998 |
| EP | 0402158 | 12/1990 |

(Continued)

OTHER PUBLICATIONS

U.S. Appl. No. 12/483,048, Response to Office Action filed Jan. 7, 2011, 10 pages.

(Continued)

*Primary Examiner* — Lucas Stelling
(74) *Attorney, Agent, or Firm* — Lathrop & Gage LLP

(57) ABSTRACT

A method for treating contaminants includes emitting plural streams of a fluid into a soil formation with the streams having different radii of influences in different directions. A directional microporous diffuser directionally emits microbubbles. Solenoid controlled valves control fluid or air distribution to inlets to provide directional control of bubble emanation.

17 Claims, 18 Drawing Sheets

(56) References Cited

U.S. PATENT DOCUMENTS

| | | |
|---|---|---|
| 3,708,206 A | 1/1973 | Hard et al. |
| 3,808,123 A | 4/1974 | Neel |
| 3,814,394 A | 6/1974 | Murray |
| 3,823,776 A | 7/1974 | Holmes |
| 3,997,447 A | 12/1976 | Breton et al. |
| 4,007,118 A | 2/1977 | Ciambrone |
| 4,021,347 A | 5/1977 | Teller et al. |
| 4,048,072 A | 9/1977 | McCullough |
| 4,049,552 A | 9/1977 | Arff |
| 4,064,163 A | 12/1977 | Drach et al. |
| 4,118,447 A | 10/1978 | Richter |
| 4,178,239 A | 12/1979 | Lowther |
| 4,203,837 A | 5/1980 | Hoge et al. |
| 4,268,283 A | 5/1981 | Roberts |
| 4,298,467 A | 11/1981 | Gartner et al. |
| 4,310,057 A | 1/1982 | Brame |
| 4,351,810 A | 9/1982 | Martinez et al. |
| 4,360,234 A | 11/1982 | Hsueh et al. |
| 4,614,596 A | 9/1986 | Wyness |
| 4,622,139 A | 11/1986 | Brown |
| 4,639,314 A | 1/1987 | Tyer |
| 4,684,479 A | 8/1987 | D'Arrigo |
| 4,695,447 A | 9/1987 | Shultz |
| 4,696,739 A | 9/1987 | Pedneault |
| 4,730,672 A | 3/1988 | Payne |
| 4,780,215 A | 10/1988 | Carlson |
| 4,804,050 A | 2/1989 | Kerfoot |
| 4,832,122 A | 5/1989 | Corey et al. |
| 4,837,153 A | 6/1989 | Laurenson, Jr. |
| 4,838,434 A | 6/1989 | Miller et al. |
| 4,844,795 A | 7/1989 | Halwani |
| 4,849,114 A | 7/1989 | Zeff et al. |
| 4,883,589 A | 11/1989 | Konon |
| 4,941,957 A | 7/1990 | Zeff et al. |
| 4,943,305 A | 7/1990 | Bernhardt |
| 4,960,706 A | 10/1990 | Bliem et al. |
| 4,966,717 A | 10/1990 | Kern |
| 4,971,731 A | 11/1990 | Zipperian |
| 5,006,250 A | 4/1991 | Roberts et al. |
| 5,025,113 A | 6/1991 | Sanderson et al. |
| 5,078,921 A | 1/1992 | Zipperian |
| 5,080,805 A | 1/1992 | Houser |
| 5,116,163 A | 5/1992 | Bernhardt |
| 5,120,442 A | 6/1992 | Kull et al. |
| 5,122,165 A | 6/1992 | Wang |
| 5,126,111 A | 6/1992 | Al-Ekabi et al. |
| 5,133,906 A | 7/1992 | Louis |
| 5,160,655 A | 11/1992 | Donker et al. |
| 5,167,806 A | 12/1992 | Wang et al. |
| 5,178,491 A | 1/1993 | Graves et al. |
| 5,178,755 A | 1/1993 | Lacrosse |
| 5,180,503 A | 1/1993 | Gorelick et al. |
| 5,205,927 A | 4/1993 | Wickramanayake |
| 5,215,680 A | 6/1993 | D'Arrigo |
| 5,221,159 A | 6/1993 | Billings et al. |
| 5,227,184 A | 7/1993 | Hurst |
| 5,238,437 A | 8/1993 | Vowles et al. |
| 5,246,309 A | 9/1993 | Hobby |
| 5,248,395 A | 9/1993 | Rastelli et al. |
| 5,254,253 A | 10/1993 | Behmann |
| 5,259,962 A | 11/1993 | Later |
| 5,269,943 A | 12/1993 | Wickramanayake |
| 5,277,518 A | 1/1994 | Billings et al. |
| 5,302,286 A | 4/1994 | Semprini et al. |
| 5,332,333 A | 7/1994 | Bentley |
| 5,348,664 A | 9/1994 | Kim et al. |
| 5,362,400 A | 11/1994 | Martinell |
| 5,364,537 A | 11/1994 | Paillard |
| 5,375,539 A | 12/1994 | Rippberger |
| 5,389,267 A | 2/1995 | Gorelick et al. |
| 5,398,757 A | 3/1995 | Corte et al. |
| RE34,890 E | 4/1995 | Sacre |
| 5,402,848 A | 4/1995 | Kelly |
| 5,403,476 A | 4/1995 | Bernhardt |
| 5,406,950 A | 4/1995 | Brandenburger et al. |
| 5,425,598 A | 6/1995 | Pennington |
| 5,427,693 A | 6/1995 | Mausgrover et al. |
| 5,430,228 A | 7/1995 | Ciambrone et al. |
| 5,431,286 A | 7/1995 | Xu et al. |
| 5,451,320 A | 9/1995 | Wang et al. |
| 5,464,309 A | 11/1995 | Mancini et al. |
| 5,472,294 A | 12/1995 | Billings et al. |
| 5,480,549 A | 1/1996 | Looney et al. |
| 5,482,630 A | 1/1996 | Lee et al. |
| 5,520,483 A | 5/1996 | Vigneri |
| 5,525,008 A | 6/1996 | Wilson |
| 5,545,330 A | 8/1996 | Ehrlich |
| 5,560,737 A | 10/1996 | Schuring et al. |
| 5,588,490 A | 12/1996 | Suthersan et al. |
| 5,609,798 A | 3/1997 | Liu et al. |
| 5,615,974 A | 4/1997 | Land et al. |
| 5,620,593 A | 4/1997 | Stagner |
| 5,622,450 A | 4/1997 | Grant et al. |
| 5,624,635 A | 4/1997 | Pryor |
| 5,663,475 A | 9/1997 | Elgal |
| 5,664,628 A | 9/1997 | Koehler et al. |
| 5,667,690 A | 9/1997 | Doddema et al. |
| 5,667,733 A | 9/1997 | Waldron, Sr. |
| 5,676,823 A | 10/1997 | McKay et al. |
| 5,698,092 A | 12/1997 | Chen |
| 5,741,427 A | 4/1998 | Watts et al. |
| 5,827,485 A | 10/1998 | Libal et al. |
| 5,833,388 A | 11/1998 | Edwards et al. |
| 5,851,407 A | 12/1998 | Bowman et al. |
| 5,855,775 A | 1/1999 | Kerfoot |
| 5,860,598 A | 1/1999 | Cruz |
| 5,879,108 A | 3/1999 | Haddad |
| 5,925,257 A | 7/1999 | Albelda et al. |
| 5,954,452 A | 9/1999 | Goldstein |
| 5,967,230 A | 10/1999 | Cooper et al. |
| 5,975,800 A | 11/1999 | Edwards et al. |
| 6,007,274 A | 12/1999 | Suthersan |
| 6,017,449 A | 1/2000 | Eriksson et al. |
| 6,083,403 A | 7/2000 | Tang et al. |
| 6,083,407 A | 7/2000 | Kerfoot |
| 6,086,769 A | 7/2000 | Kilambi et al. |
| 6,136,186 A | 10/2000 | Gonzalez-Martin et al. |
| 6,139,755 A | 10/2000 | Marte et al. |
| 6,149,819 A | 11/2000 | Martin et al. |
| 6,210,955 B1 | 4/2001 | Hayes |
| 6,214,240 B1 | 4/2001 | Yasunaga et al. |
| 6,217,767 B1 | 4/2001 | Clark |
| 6,221,002 B1 | 4/2001 | Bruce |
| 6,254,310 B1 | 7/2001 | Suthersan |
| 6,283,674 B1 | 9/2001 | Suthersan |
| 6,284,143 B1 | 9/2001 | Kerfoot |
| 6,306,296 B1 | 10/2001 | Kerfoot |
| 6,312,605 B1 | 11/2001 | Kerfoot |
| 6,352,387 B1 | 3/2002 | Briggs et al. |
| 6,357,670 B2 | 3/2002 | Ganan-Calvo |
| 6,364,162 B1 | 4/2002 | Johnson |
| 6,391,259 B1 | 5/2002 | Malkin et al. |
| 6,403,034 B1 | 6/2002 | Nelson et al. |
| 6,428,694 B1 | 8/2002 | Brown |
| 6,436,285 B1 | 8/2002 | Kerfoot |
| 6,447,676 B1 | 9/2002 | Kerfoot |
| 6,488,850 B2 | 12/2002 | Perriello |
| 6,533,499 B2 | 3/2003 | Breeding |
| 6,582,611 B1 | 6/2003 | Kerfoot |
| 6,596,161 B2 | 7/2003 | Kerfoot |
| 6,596,177 B2 | 7/2003 | Sherman |
| 6,623,211 B2 | 9/2003 | Kukor et al. |
| 6,645,450 B2 | 11/2003 | Stoltz et al. |
| 6,733,207 B2 | 5/2004 | Liebert, Jr. et al. |
| 6,736,379 B1 | 5/2004 | Wegner et al. |
| 6,745,815 B1 | 6/2004 | Senyard |
| 6,773,609 B1 | 8/2004 | Hashizume |
| 6,780,329 B2 | 8/2004 | Kerfoot |
| 6,787,038 B2 | 9/2004 | Brusseau et al. |
| 6,805,798 B2 | 10/2004 | Kerfoot |
| 6,818,136 B1 | 11/2004 | Marek |
| 6,827,861 B2 | 12/2004 | Kerfoot |
| 6,866,781 B2 | 3/2005 | Schindler |
| 6,872,318 B2 | 3/2005 | Kerfoot |

(56) References Cited

U.S. PATENT DOCUMENTS

| | | | |
|---|---|---|---|
| 6,913,251 | B2 | 7/2005 | Kerfoot |
| 6,921,477 | B2 | 7/2005 | Wilhelm |
| 6,984,329 | B2 | 1/2006 | Kerfoot |
| 7,022,241 | B2 | 4/2006 | Kerfoot |
| 7,033,492 | B2 | 4/2006 | Kerfoot |
| 7,131,638 | B2 | 11/2006 | Kerfoot |
| 7,156,984 | B2 | 1/2007 | Kerfoot |
| 7,208,090 | B2 | 4/2007 | Applegate et al. |
| 7,264,419 | B2 | 9/2007 | Bowman et al. |
| 7,264,747 | B2 | 9/2007 | Kerfoot |
| 7,300,039 | B2 | 11/2007 | Kerfoot |
| 7,442,313 | B2 | 10/2008 | Kerfoot |
| 7,537,706 | B2 | 5/2009 | Kerfoot |
| 7,547,338 | B2 | 6/2009 | Kerfoot |
| 8,557,110 | B2 | 10/2013 | Kerfoot |
| 2002/0029493 | A1 | 3/2002 | Baek |
| 2002/0109247 | A1 | 8/2002 | Jager et al. |
| 2003/0029792 | A1 | 2/2003 | Kerfoot |
| 2003/0222359 | A1 | 12/2003 | Jager |
| 2004/0045911 | A1 | 3/2004 | Kerfoot |
| 2005/0067356 | A1 | 3/2005 | Bowman et al. |
| 2006/0243668 | A1 | 11/2006 | Miller et al. |

FOREIGN PATENT DOCUMENTS

| | | |
|---|---|---|
| EP | 0546335 | 6/1993 |
| GB | 2005655 A | 4/1979 |
| GB | 2185901 A | 8/1987 |
| JP | 1-304838 | 12/1989 |
| JP | 3267196 | 11/1991 |
| JP | 4-171036 | 6/1992 |
| JP | 6-023378 | 1/1994 |
| JP | 407178391 | 7/1995 |
| JP | 40931314 | 12/1997 |
| WO | WO 98/21152 | 5/1998 |
| WO | WO 99/54258 | 10/1999 |
| WO | WO9956894 | 11/1999 |
| WO | WO0226640 | 4/2002 |
| WO | WO0235908 | 5/2002 |
| WO | WO 2005063367 | 7/2005 |

OTHER PUBLICATIONS

U.S. Appl. No. 12/483,048, Office Action mailed Mar. 30, 2011, 18 pages.
U.S. Appl. No. 12/847,931, Office Action mailed Feb. 9, 2011, 11 pages.
U.S. Appl. No. 12/483,048, Response to Office Action filed Apr. 13, 2010, 20 pages.
U.S. Appl. No. 12/483,048, Office Action mailed Jul. 12, 2010, 19 pages.
U.S. Appl. No. 12/483,048, Response to Office Action filed Sep. 10, 2010, 13 pages.
U.S. Appl. No. 12/483,048, Office Action mailed Oct. 7, 2010, 21 pages.
PCT/US04/43634 International Preliminary Report on Patentability, Jun. 26, 2006, 5 pages.
Makarov, A. M. & Sorokin, S.S., "Heat Exchange of a Bubble Coated with a Liquid Film on the Rear Surface," Chemical and Petroleum Engineering, vol. 30, No. 2, 1994, pp. 78-81.
Abstract JP 6-238260, Aug. 30, 1994, Karuto.
U.S. Appl. No. 09/470,167 (U.S. 6,436,285) Selected pages from File History dated Aug. 23, 2002 through Mar. 29, 2001, 38 pages.
U.S. Appl. No. 09/860,659.
U.S. Appl. No. 09/943,111.
U.S. Appl. No. 09/993,152.
U.S. Appl. No. 10/223,166 (U.S. 6,596,161) Selected pages from File History dated Nov. 6, 2002 through Jul. 22, 2003, 22 pages.
U.S. Appl. No. 10/354,584.
U.S. Appl. No. 10/365,027.
U.S. Appl. No. 10/602,256.
U.S. Appl. No. 10/745,939.
U.S. Appl. No. 10/895,015.
U.S. Appl. No. 10/910,441.
U.S. Appl. No. 10/916,863.
U.S. Appl. No. 10/963,353.
U.S. Appl. No. 10/994,960.
U.S. Appl. No. 10/997,452.
U.S. Appl. No. 11/145,871.
U.S. Appl. No. 11/145,871, Response to Office Action filed Dec. 16, 2008, 12 pages.
U.S. Appl. No. 11/145,871, Office Action mailed Mar. 18, 2009, 16 pages.
U.S. Appl. No. 11/146,722.
U.S. Appl. No. 11/272,446 Selected pages from File History dated Jan. 22, 2008 through May 1, 2009, 60 pages.
U.S. Appl. No. 11/272,446 Supplemental Notice of Allowance May 1, 2009, 2 pages.
U.S. Appl. No. 11/328,475.
U.S. Appl. No. 11/485,080.
U.S. Appl. No. 11/485,080, Response to Office Action filed May 8, 2009, 4 pages.
U.S. Appl. No. 11/485,223.
U.S. Appl. No. 11/849,413.
U.S. Appl. No. 12/254,359, Notice of Allowance dated Apr. 1, 2009, 7 pages.
U.S. Appl. No. 12/259,051, Office Action dated Mar. 24, 2009, 6 pages.
*ThinkVillage-Kerfoot LLC v. Groundwater & Environmental Services, Inc.*, Complaint for Patent Infringement, US District Court for the District of Massachusetts, Oct. 7, 2008, 5 pages.
*ThinkVillage-Kerfoot LLC v. Groundwater & Environmental Services, Inc.*, Answer and Counterclaims, Civil Action No. 1:08-cv-11711-GAO, Dec. 5, 2008, 7 pages.
*ThinkVillage-Kerfoot LLC v. Groundwater & Environmental Services, Inc.*, Amended Answer and Counterclaims, Civil Action No. 1:08-cv-11711-GAO, Dec. 15, 2008, 7 pages.
*ThinkVillage-Kerfoot LLC v. Groundwater & Environmental Services, Inc.*, Plaintiff's Response to Defendant Groundwater & Environmental Services, Inc.'s Amended Counterclaims, Civil Action No. 1:08-cv-11711-GAO, Dec. 30, 2008, 5 pages.
Civil Action No. 1:08-cv-11711-GAO, Groundwater & Environmental Services, Inc.'s Objections And Responses To Plaintiff's Requests For Production of Documents And Things, Mar. 4, 2009, 54 pages.
Civil Action No. 1:08-cv-11711-GAO, Groundwater & Environmental Services, Inc.'s Objections And Answers To Plaintiff's Interrogatories, Mar. 4, 2009, 10 pages.
Civil Action No. 1:08-cv-11711-GAO, ThinkVillage-Kerfoot, LLC's Responses To Defendant's Interrogatories (Nos. 1-11) Apr. 9, 2009, 12 pages.
Civil Action No. 1:08-cv-11711-GAO, ThinkVillage-Kerfoot, LLC's Objections And Responses To Defendant's First Set of Requests For Production (Nos. 1-98) Apr. 9, 2009, 37 pages.
Civil Action No. 1:08-cv-11711-GAO, ThinkVillage-Kerfoot, LLC's Supplemental Responses To Defendant's Interrogatories (Nos. 7 and 8) Jun. 2, 2009, 9 pages.
Civil Action No. 1:08-cv-11711-GAO, Groundwater & Environmental Services, Inc.'s Supplemental Response to Plaintiff's Interrogatory Three, Jun. 25, 2009, 36 pages.
Civil Action No. 1:08-cv-11711-GAO, Groundwater & Environmental Services, Inc.'s Supplemental Response to Plaintiff's Interrogatories Three and Four, Jul. 6, 2009, 164 pages.
U.S. Appl. No. 10/794,994.
U.S. Appl. No. 10/963,361.
U.S. Appl. No. 11/145,871 Response to Office Action filed Jun. 18, 2009, 10 pages.
U.S. Appl. No. 11/409,892.
U.S. Appl. No. 11/485,223 Office Action mailed Jun. 15, 2009, 8 pages.
PCT/US05/25478, International Search Report & Written Opinion, mailed Feb. 15, 2006, 4 pages.
PCT/US05/25478, International Preliminary Report on Patentability, Jan. 23, 2007, 4 pages.
U.S. Appl. No. 11/594,019.

(56) References Cited

OTHER PUBLICATIONS

U.S. Appl. No. 12/254,359, Notice of Allowance dated Jul. 6, 2009, 4 pages.
U.S. Appl. No. 12/259,051, Response to Office Action filed Jun. 23, 2009, 8 pages.
U.S. Appl. No. 12/272,462, Restriction Requirement mailed Jun. 2, 2009, 6 pages.
U.S. Appl. No. 12/272,462, Response to Restriction Requirement filed Jul. 2, 2009, 12 pages.
U.S. Appl. No. 11/485,080, Notice of Allowance dated Jul. 9, 2009, 4 pages.
Canadian Patent Application No. 2,351,257, Office Action dated May 1, 2009, 4 pages.
U.S. Appl. No. 12/177,467.
U.S. Appl. No. 12/177,467 Notice of Allowance dated Sep. 2, 2009, 8 pages.
U.S. Appl. No. 12/259,051 Notice of Allowance dated Aug. 24, 2009, 7 pages.
U.S. Appl. No. 11/485,223 Notice of Allowance dated Sep. 2, 2009, 7 pages.
U.S. Appl. No. 12/272,462 Notice of Allowance dated Sep. 21, 2009, 8 pages.
U.S. Appl. No. 11/409,892, Notice of Allowance dated Oct. 1, 2009, 5 pages.
U.S. Appl. No. 11/145,871, Notice of Allowance dated Sep. 9, 2009, 7 pages.
Canadian Application No. 2,441,259 Office Action dated Oct. 14, 2009, 7 pages.
U.S. Appl. No. 12/483,048 Office Action dated Jan. 13, 2010, 18 pages.
Wilkins (ed.) et al. "Workshop on Monitoring Oxidation-Reduction Processes for Ground-water Restoration," EPA, (2000), 148 pages.
U.S. Appl. No. 12/483,048, Response to Office Action filed May 31, 2011, 6 pages.
U.S. Appl. No. 12/483,048, Advisory Action mailed Jun. 27, 2011, 4 pages.
U.S. Appl. No. 12/847,931 Response to Office Action filed Aug. 22, 2011, 8 pages.
U.S. Appl. No. 12/847,931 Office Action mailed Jun. 20, 2011, 10 pages.
U.S. Appl. No. 12/847,931 Response to Office Action filed Apr. 25, 2011, 18 pages.
U.S. Appl. No. 12/483,048 Response to Office Action filed Sep. 30, 2011, 9 pages.
U.S. Appl. No. 12/847,931 Notice of allowance mailed Oct. 14, 2011, 5 pages.
U.S. Appl. No. 12/483,048 Office Action mailed Oct. 12, 2011, 22 pages.
European Application No. 05793889.6 Extended European Search Report dated Dec. 15, 2011, 7 pages.
U.S. Appl. No. 12/483,048 Response to Office Action filed Jan. 12, 2012, 6 pages.
U.S. Appl. No. 12/847,931 Notice of allowance mailed Feb. 15, 2012, 8 pages.
U.S. Appl. No. 12/483,048, Advisory Action mailed Apr. 13, 2012, 4 pages.
U.S. Appl. No. 12/483,048, Response to Final Rejection filed Mar. 30, 2012, 9 pages.
U.S. Appl. No. 12/483,048, Office Action mailed Jan. 30, 2012, 22 pages.
U.S. Appl. No. 12/631,596 Notice of Allowance mailed Jul. 5, 2012, 8 pages.
U.S. Appl. No. 12/483,048 Response to Final Office Action filed Jul. 30, 2012, 10 pages.
Marley, M.C. et al. "The Application of a 3-D Model In The Design Of Air Sparging Systems" Eastern Ground Water Issues Proceedings, 1992, pp. 377-392.
Marley, M.C. et al. The Application of In Situ Air Sparging as an Innovative Soils and Ground Water Remediation Technology, Spring 1992 GWMR, pp. 137-145.
U.S. Appl. No. 12/688,816 Response to Notice of Noncompliant Amendment filed Mar. 5, 2013, 5 pages.
U.S. Appl. No. 12/688,816 Response to Office Action filed Dec. 19, 2012, 14 pages.
U.S. Appl. No. 12/688,816 Office Action mailed Jul. 20, 2012, 15 pages.
U.S. Appl. No. 12/688,816 Response to Office Action filed Jun. 23, 2013, 7 pages.
U.S. Appl. No. 12/688,816 Notice of Allowance mailed Jul. 10, 2013, 9 pages.
U.S. Appl. No. 12/688,816 Office Action Mailed May 20, 2013, 8 pages.
U.S. Appl. No. 12/688,816 Notice of Noncompliant Amendment mailed Feb. 6, 2013, 2 pages.
U.S. Appl. No. 12/483,048 Office Action mailed Jul. 23, 2013,, 6 pages.
U.S. Appl. No. 12/483,048 Office Action mailed Nov. 28, 2012, 14 pages.
U.S. Appl. No. 12/483,048 Response to Office Action filed May 24, 2013,, 12 pages.

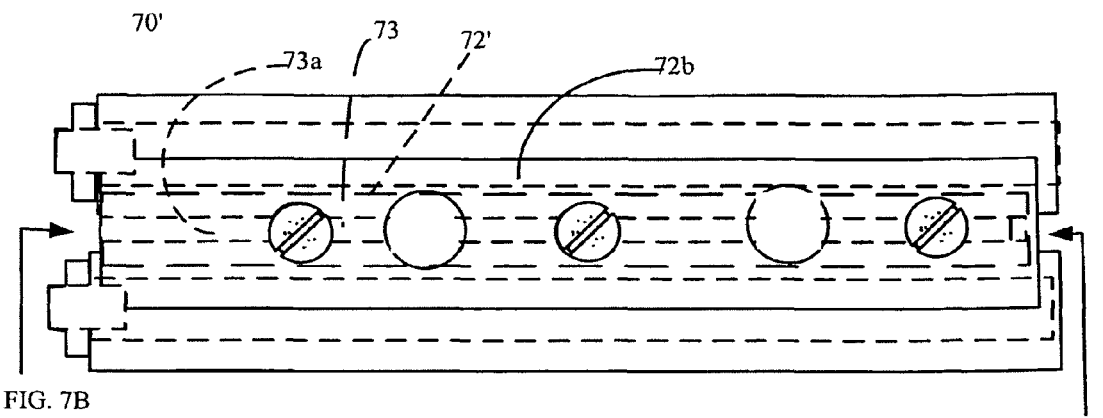
FIG. 7A
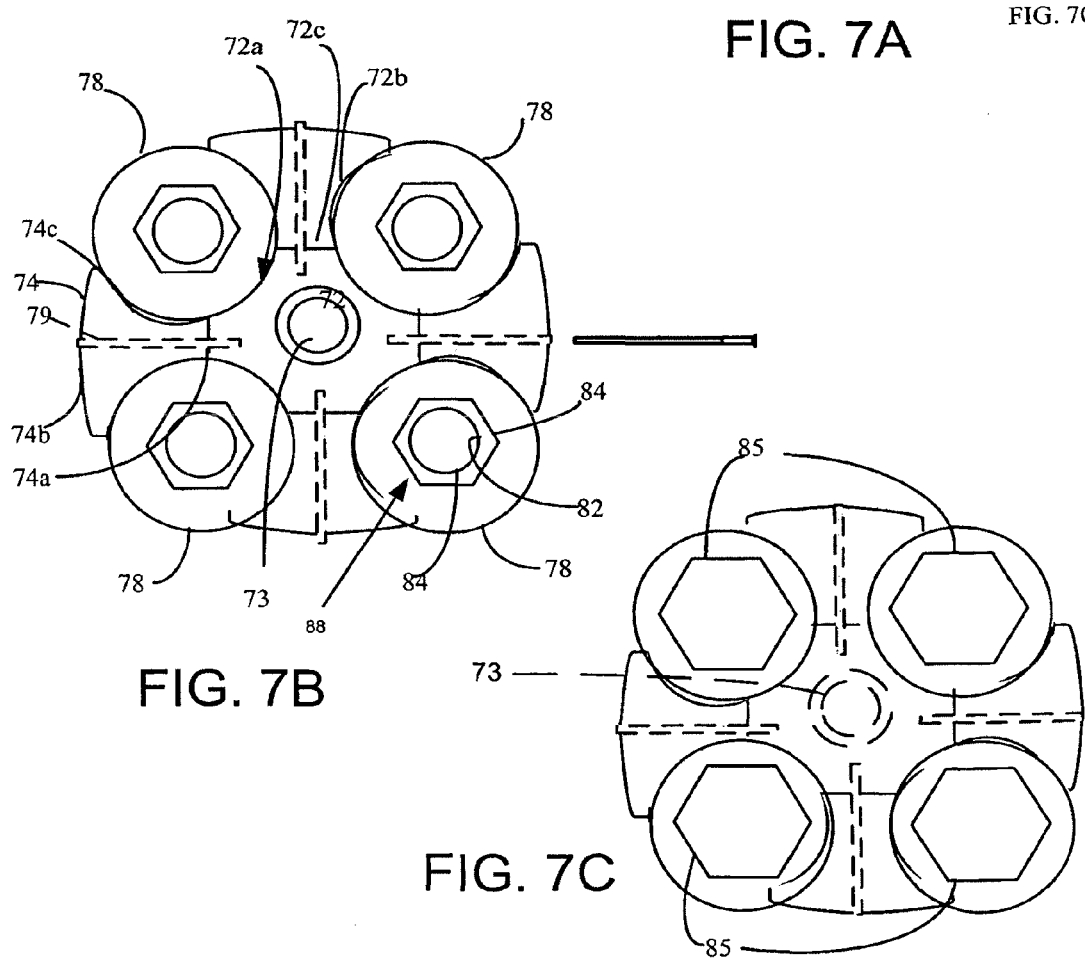
FIG. 7B
FIG. 7C

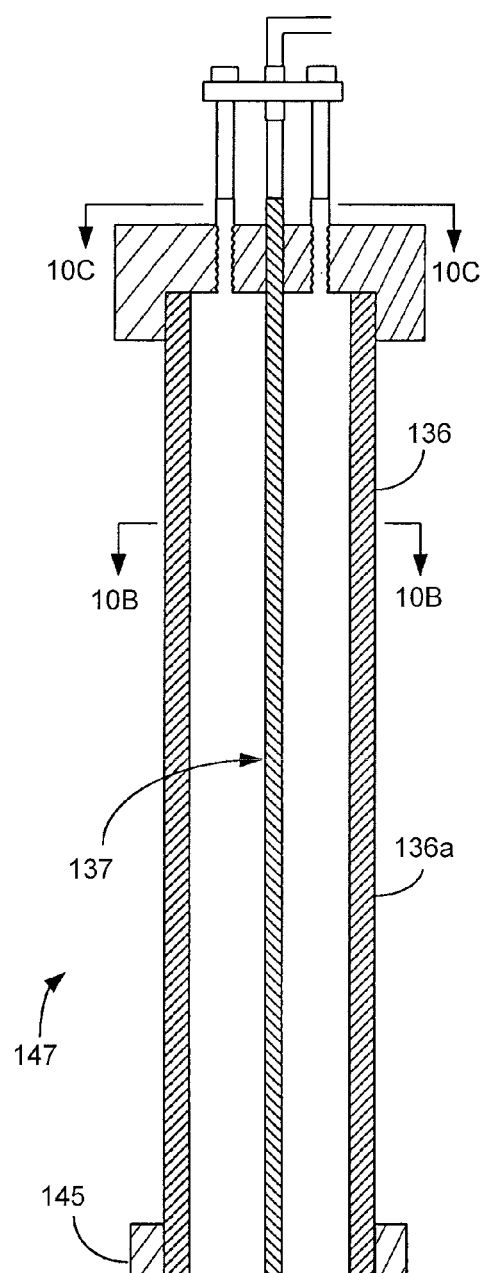
FIG. 10A
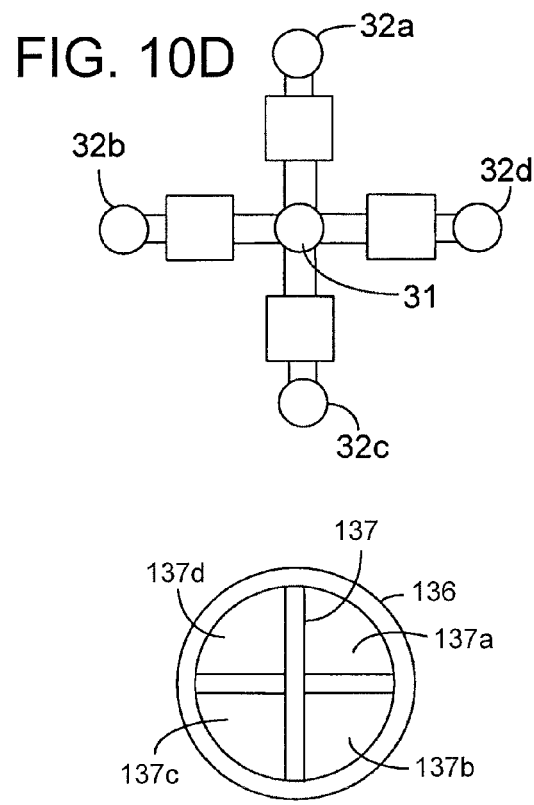
FIG. 10D
FIG. 10B
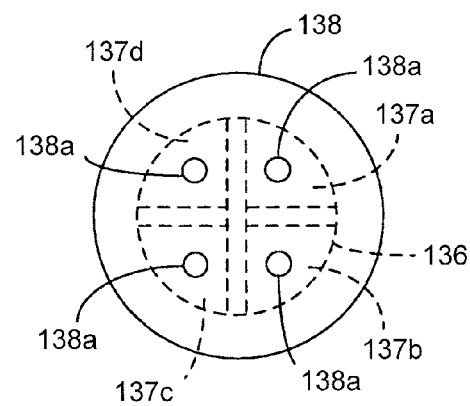
FIG. 10C

DIRECTIONAL MICROPOROUS DIFFUSER AND DIRECTIONAL SPARGING

RELATED APPLICATIONS

This application is a continuation-in-part of U.S. application Ser. No. 11/272,446, filed Nov. 10, 2005 now U.S. Pat. No. 7,569,140. This application is also a continuation-in-part of U.S. application Ser. No. 12/177,467 filed Jul. 22, 2008 now U.S. Pat. No. 7,648,640, which is a Divisional of U.S. application Ser. No. 10/745,939, filed Dec. 24, 2003 (now U.S. Pat. No. 7,401,767). This application is also a continuation-in-part of U.S. application Ser. No. 11/485,080, filed Jul. 12, 2006 now U.S. Pat. No. 7,621,696. This application is also a continuation-in-part of U.S. application Ser. No. 11/485,223 filed Jul. 12, 2006 now U.S. Pat. No. 7,651,611. The contents of each of the aforementioned applications are incorporated herein by reference.

BACKGROUND

There is a well-recognized need to clean-up contaminants found in ground water, i.e., aquifers and surrounding soil formations. Such aquifers and surrounding soil formations may be contaminated with various constituents including organic compounds such as, volatile hydrocarbons, including chlorinated hydrocarbons such as dichloroethene (DCE), trichloroethene (TCE), and tetrachloroethene (PCE). Other contaminates that can be present include vinyl chloride, 1,1,1 trichloroethane (TCA), 1,1 dichloroethane (DCA), 1,4 dioxane, and very soluble gasoline additives such as methyl tertiary butyl ether (MTBE). Other contaminants may also be encountered.

SUMMARY

Often such contaminants are found in areas that are inaccessible, e.g. under parking lots, road beds buildings, airport runways, high-use highways, and the like where sparging techniques that require drilling of wells or driving of microporous diffusers directly into soils, close to or underneath such road beds, parking lots, buildings and the like may be impractical because of the large number of penetrations through reinforced concrete or surfaces sensitive to loading or proximity to heavily traveled or used area.

According to an aspect of this invention, a method includes delivering plural streams of a fluid to plural inlets of a diffuser comprised of plural hollow elongated members each having porous sidewalls and emitting at least one stream of the fluid into a soil formation through at least one of the plural hollow, elongated members.

Other aspects of the invention include that the inlets are coupled to one end of the plural hollow members with opposing ends of the members being sealed. The method includes sequencing fluids to the inlets to provide the plural streams in different sequences. The method includes controlling a solenoid controlled, multi-port valve to sequencing fluids to the inlets to provide the plural streams in different sequences. The diffuser is a microporous diffuser and includes a holder member supporting the plural hollow, elongated members in plural compartments of the holder member. The elongated members are comprised of well screen. The method includes emitting microbubbles having a bubble size of less than 200 microns. The method includes driving the diffuser into the ground. The method includes disposing the diffuser in a well. The diffuser emits microbubbles having a size in a range of 1 to 200 microns. The diffuser is comprised of 10 slot well-screen. The diffuser is comprised of a mesh having a mesh size in a range of 40 to 200 mesh.

Other aspects of the invention include delivering plural streams of a fluid into a soil formation with the plural streams having different radii of influences in different directions. The plural streams may be delivered through a diffuser. Emitting the streams of different radii includes selecting the amount of surface area to the diffuser through which the plural streams are emitted from the diffuser. The method includes sequencing fluids to the diffuser to provide the emitted plural streams into a well or soil formation in different sequences, having the different radii of influences.

The method may include operating a solenoid controlled distribution valve in proximity to inlet ports of the diffuser to control sequencing of fluids into inlets of the diffuser. The method includes delivering a stream of a fluid to the solenoid controlled valve and delivering plural streams from the solenoid controlled valve to inlets of the diffuser.

According to a further aspect of the invention, an apparatus includes a plurality of directional diffusers arranged in a spaced arrangement to treat a site, a trunk line that delivers a fluid to the plurality of directional diffusers, a plurality of multi-port distribution valves in proximity to inlet ports of the directional diffusers; and for each of the multi-port distribution values and a plurality of feed lines coupled from the multi-port distribution value to inlets on the directional diffusers.

Other aspects of the invention include an ozone generator coupled to the trunk line and wherein the first fluid comprises ozone. The apparatus includes an air compressor coupled to the trunk line and an ozone generator coupled to the trunk line and wherein the first fluid comprises air-ozone. At least one of the directional diffusers has an inlet for receiving a flow of a second fluid. At least one of the directional diffusers includes an inlet for receiving a flow of a second fluid, that is surrounded by a plurality of inlets that receive flows of the first fluid. The apparatus includes a source of air-ozone as the first fluid and a source of a peroxide as the second fluid. The directional diffusers are microporous directional diffusers and the apparatus includes a source of air-ozone as the first fluid and a source of a peroxide as the second fluid. The directional diffuser is microporous having a pore size in a range of 0.1 to 200 microns.

According to a still further aspect of the invention, an apparatus includes a holder member having plural compartments, plural hollow, elongated members having porous sidewalls, the plural hollow, elongated members supported in the plural compartments of the holder member with each hollow, elongated member including, an inlet port at a first end of the elongated member with the second end of the elongated member being sealed.

The apparatus also includes plural elongated support pieces having a first surface that is connected to the holder member and a second surface that forms, in part, the plural compartments supporting the plural elongated members. The compartments may be arranged in quadrants.

The outer surfaces of the support pieces have holes to receive fasteners to secure the support pieces to the elongated support. The inner surfaces of the support pieces have a curvature that corresponds to a curvature of the plural elongated members. The elongated members have a cylindrical shape. At least one of the outer surfaces of the support pieces has a width that is different than a width of at least one other outer surface one of the support pieces.

The second surfaces of the plural elongated support pieces, which provide the plural compartments, provide the compartments having curved sidewalls that have a curvature corresponding to a curvature of the plural elongated members.

The apparatus includes fasteners disposed along the plural elongated support pieces to hold the plural members in the compartments of the holder member. The apparatus holder member has a borehole through a length of the holder member. The apparatus includes an inlet attached to the holder member to feed fluid into the borehole in the holder member.

Other aspects of the invention include the holder member is elongated, with sidewalls of the plural hollow, elongated members having a porosity characteristic of 10 slot well-screen or less. Sidewalls of the plural elongated members have a porosity characteristic of less than 200 microns. The plural, hollow elongated members are comprised of a metal or a plastic. The plural, hollow elongated members are comprised of a plastic that is a hydrophobic material. The plural, hollow elongated members are comprised of sintered, fused microscopic particles of plastic.

The apparatus includes at least one band that is disposed about the plural members to hold the plural members in the compartments of the holder member.

According to an aspect of this invention, a microporous diffuser includes a holder member having plural compartments, each compartment having a generally partially circular sidewall, plural hollow, cylindrical tubes having porous sidewalls, the plural hollow, cylindrical tubes supported in the plural compartments of the holder member with each hollow, cylindrical tube including, an inlet port at a first end of the cylindrical tubes with a second end of the cylindrical tube being sealed.

One or more advantages can be provided from the above. While, a non-directional microporous diffuser can enlarge its radius of influence (ROI) by placing the non-directional microporous diffuser deeper within an aquifer, e.g., a substantial distance below the contaminants, the directional microporous diffuser provides a mechanism that can discharge microbubbles over a broad lateral area while having directional microporous diffuser remain close to contaminated groundwater zones during sparging.

The directional microporous diffuser can cover broad lateral areas without diluting its effectiveness, since the oxidant gas emitted from the directional microporous diffuser can be emitted close to the source of contamination. It is possible that the effective radius of influence can be expanded, at least two-fold, without increasing the flow, by sequentially directing fluid from portions of the directional diffuser.

The lateral areas over which the microbubbles are emitted can be larger since all of the microbubbles emitted from the directional microporous diffuser can be directed into one area at a time.

The provision of multiple cylindrical members that are independently fed a fluid stream and independently controlled permits microbubbles to emerge from the directional microporous diffuser in accordance with which of the inlet ports of the directional microporous diffuser receives the fluid stream from the outlet ports of the solenoid-controlled valve. The directional microporous diffuser together with the solenoid valve permits a gas stream from the central feed to be directed through one, two, three or all four of the quadrants of the directional microporous diffuser. In general, using a single quadrant at a time permits the microbubbles to exit the directional microporous diffuser and provide a generally elliptical shaped zone of influence in the surrounding soil formation. The zone of influence will extend further in a direction perpendicular from the directional microporous diffuser than tangentially from the sidewalls of the directional microporous diffuser.

By judicious selection of widths of holder pieces, the beams of fluids emitted form the diffuser can be tailored to site conditions allowing an operator to provide streams with different radii of influences and, indeed, differently shaped patterns. Thus with different widths of holder pieces can direct treatment fluids towards especially high concentrations of contaminants while minimizing treatment materials in areas of lower contaminant concentrations.

The solenoid-controlled valve can be controlled to rotate the pattern of microbubbles emitted from the directional microporous diffuser. Thus, microbubbles exit from only a first quadrant during a first time period, then only from a second quadrant during a second time period, and so forth. The control can be automated or manual. The directional microporous diffuser allows fewer wells and sparging arrangements to be constructed on a site for a given sparging arrangement capacity, since all of the capacity of the pumps and so forth can be directed into a single portion, e.g., quadrant of a microporous diffuser at any one time.

The details of one or more embodiments of the invention are set forth in the accompanying drawings and the description below. Other features, objects, and advantages of the invention will be apparent from the description and drawings, and from the claims.

According to still a further aspect, a method includes delivering a stream of a fluid to a directional microporous diffuser that has a sidewall with microscopic openings and has a partitioned interior region to effect discharge of microbubbles from less than the entire sidewall portion of the directional microporous diffuser.

Other aspects include the directional microporous diffuser including an elongated member providing the sidewall, the sidewall defining an interior portion of said member and coupled to the first inlet port, a partition member that divides the interior of the elongated member into plural, mutually isolated regions and caps to seal ends of the directional microporous diffuser. The elongated member is a cylinder. The caps support the first inlet port and additional plural inlet ports. The first inlet port and additional plural inlet ports are arranged to be in fluid communication with corresponding ones of the mutually isolated regions of the directional microporous diffuser. A solenoid-controlled distribution valve is coupled to the first inlet ports and additional plural inlet ports. The microporous diffuser can be disposed in a well or injected. The microporous diffuser emits microbubbles having a size in a range of 1 to 200 microns. The partitioning member divides the interior of the elongated member into four quadrants.

According to a further embodiment, an apparatus includes a distribution arrangement to receive a fluid, a directional microporous diffuser, the directional microporous diffuser including an hollow elongated member having a sidewall with a large plurality of microporous openings, a partitioning member disposed in the interior of the hollow elongated member to divide the interior of the hollow elongated member into mutually isolated regions, with the regions being in fluid communication with the distribution arrangement and a control arrangement to control the distribution arrangement to effect discharge of fluid into selected ones of the mutually isolated regions in the elongated member to cause microbubbles to emanate from correspond portions of the sidewall of the directional microporous diffuser.

Other aspects of the preset instrumentalities include an ozone generator coupled to the first port of the directional microporous diffuser to deliver ozone and air as the first and second fluids. The elongated member is a cylinder. Microbubbles emanate from less than the entire sidewall portion of the directional microporous diffuser. The apparatus further includes a first pump to deliver a first stream of first fluid to the distribution arrangement and a second pump to deliver a second stream of a second fluid to the distribution arrangement. The directional microporous diffuser emits microbubbles having a size in a range of 1 to 200 microns.

According to a still further aspect of this invention, apparatus includes an elongated hollow member having a sidewall with a porosity characteristic, a partitioning member disposed within the elongated hollow member to partition the interior of the elongated hollow member into plural, mutually isolated chambers, a first cap with plural inlet ports that are in fluid communication with the plural mutually isolated chambers and an end cap to seal a second end of the directional microporous diffuser.

The sidewalls of the elongated member have a porosity characteristic of less than 200 microns. The sidewalls of the elongated member have a porosity characteristic of less than 100 microns. The directional microporous diffuser emits microbubbles having a size in a range of 0.5 to 80 microns. The sidewall is comprised of a metal or a plastic. The sidewall is of a hydrophobic material. The sidewall is comprised of sintered fused microscopic particles of plastic.

According to a still further aspect of this invention, a directional microporous diffuser includes a first elongated member including at least one sidewall having a plurality of microscopic openings, the sidewall defining an interior hollow portion of said member. The directional microporous diffuser further includes a second elongated member having a second sidewall having a plurality of microscopic openings, the second member being disposed through the hollow region of the first member. The directional microporous diffuser further includes a first partitioning member disposed inside and along a length of the first elongated member to provide a first plurality of isolated chambers and a second partitioning member disposed of the first elongated member and the second elongated member along the length of the first and second elongated members to provide a second plurality of isolated chambers. The directional microporous diffuser further includes an end cap to seal a first end of the directional microporous diffuser and an inlet cap disposed at a second end of directional microporous diffuser for receiving inlet fittings.

Other embodiments include the directional microporous diffuser having a region defined between the first and second elongated members filled with a catalyst suspension material. The directional microporous diffuser of claim has the first and second partitioning members aligned to provide the first plurality of isolated chambers aligned to the second plurality of isolated chambers. The directional microporous diffuser includes the inlet cap includes multiple inlet fittings, a first portion of the multiple inlet fittings in fluid communication with the corresponding chambers in the first member, and a second portion of the multiple inlet fittings in fluid communication with the corresponding chambers in the second member.

One or more advantages can be provided from the above.

While, a non-partitioned microporous diffuser can enlarge its radius of influence (ROI) by placing the non-partitioned microporous diffuser deeper within an aquifer, e.g., a substantial distance below the contaminants, the directional microporous diffuser provides a mechanism that can discharge microbubbles over a broad lateral area while having directional microporous diffuser remain close to contaminated groundwater zones during sparging. The directional microporous diffuser can cover broad lateral areas without diluting its effectiveness, since the oxidant gas emitted from the directional microporous diffuser can be emitted close to the source of contamination. The lateral areas over which the microbubbles are emitted can be larger since all of the microbubbles emitted from the directional microporous diffuser can be directed into one area at a time.

The partitioning member permits microbubbles to emerge from the surface of the directional microporous diffuser over portions of the directional microporous diffuser in accordance with which of the inlet ports of the directional microporous diffuser receives the fluid stream from the outlet ports of the solenoid-controlled valve. The partition member in the directional microporous diffuser together with the solenoid valve permits a gas stream from the central feed to be directed through one, two, three or all four of the quadrants of the directional microporous diffuser. In general, using a single quadrant at a time permits the microbubbles to exit the directional microporous diffuser and provide a generally elliptical shaped zone of influence in the surrounding soil formation. The zone of influence will extend further in a direction perpendicular from the directional microporous diffuser than tangentially from the sidewalls of the directional microporous diffuser The solenoid-controlled valve can be controlled to rotate the pattern of microbubbles emitted from the directional microporous diffuser. Thus, microbubbles exit from only a first quadrant during a first time period, then only from a second quadrant during a second time period, and so forth. The control can be automated or manual. The directional microporous diffuser allows fewer wells and sparging arrangements to be constructed on a site for a given sparging arrangement capacity, since all of the capacity of the pumps and so forth are directed into a single portion, e.g., quadrant of a microporous diffuser at any one time. The directional microporous diffuser can also be used to direct treatment towards especially high concentrations of contaminants while minimizing treatment materials in areas of lower contaminant concentrations.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

FIGS. 7A-7C are diagrams depicting details of a directional diffuser in the example shown in FIG. 1A or 1B.

FIGS. 10A-10D are diagrams depicting details of connections of a directional diffuser in the example shown in FIG. 1C or 1D.

DETAILED DESCRIPTION

Figure 1A:
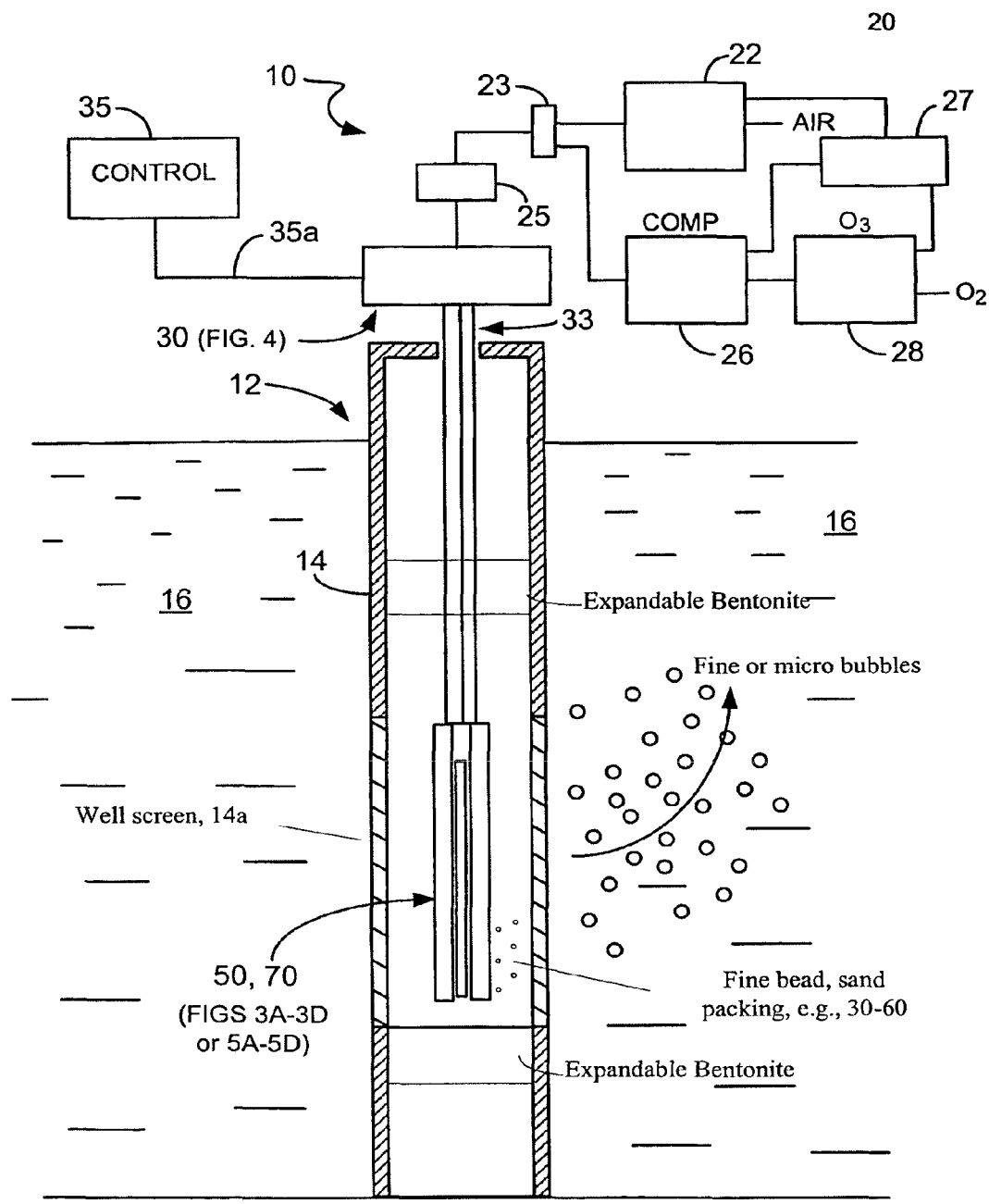
FIGS. 1A-1D are cross-sectional views showing sparging treatment examples.

Referring now to FIG. 1A, a sparging arrangement 10 for treating plumes, sources, deposits or occurrences of contaminants, is shown. The arrangement 10 is disposed in a well 12 that has a casing 14 with screen 14a. The casing 14 supports the ground about the well 12. Disposed through the casing 14 are one or more directional microporous diffusers 50, 70 (discussed in FIG. 3A-3C or 5A-5C).

The arrangement 10 also includes a first air compressor/pump 22 and a compressor/pump control mechanism 27 to feed a first fluid, e.g., air into a two port mixing valve 23 and a second pump 26 and coupled to a second source, e.g., an ozone generator 28 to feed ozone (O3) to the mixing valve 23. Other arrangements are possible.

The mixing valve 23 is coupled via a check valve 25 to an inlet port of a solenoid-controlled valve 30. Solenoid-controlled valve 30, as shown in FIG. 4, has a common inlet port 31 and here four branch or outlet ports 32a-32d. A control arrangement 35 controls the solenoid-controlled valve 30. The control arrangement 35 can be a series of switches to actuate the solenoids, via lines 35a, or could be more complicated schemes. The gas mixture from the central mixing valve 23 is distributable to each of the outlet ports 32a-32d (FIG. 4) of the solenoid-controlled valve 30.

In some embodiments, packing material, e.g., sand may be disposed around the directional microporous diffuser 50, 70.

A conventional microporous diffuser can enlarge its radius of influence (ROI) by placing the microporous diffuser deeper within an aquifer, e.g., a substantial distance below the contaminants. However, this approach dilutes the effectiveness of such a microporous diffuser since the oxidant gas emitted from the conventional microporous diffuser travels vertically for some distance in order to reach the contaminants. Along the way some of the oxidant can dissolve, is absorbed or otherwise becomes ineffective. The directional microporous diffuser 50, 70 provides a mechanism that can cover broad lateral areas while staying close to contaminated groundwater zones.

Figure 1B:
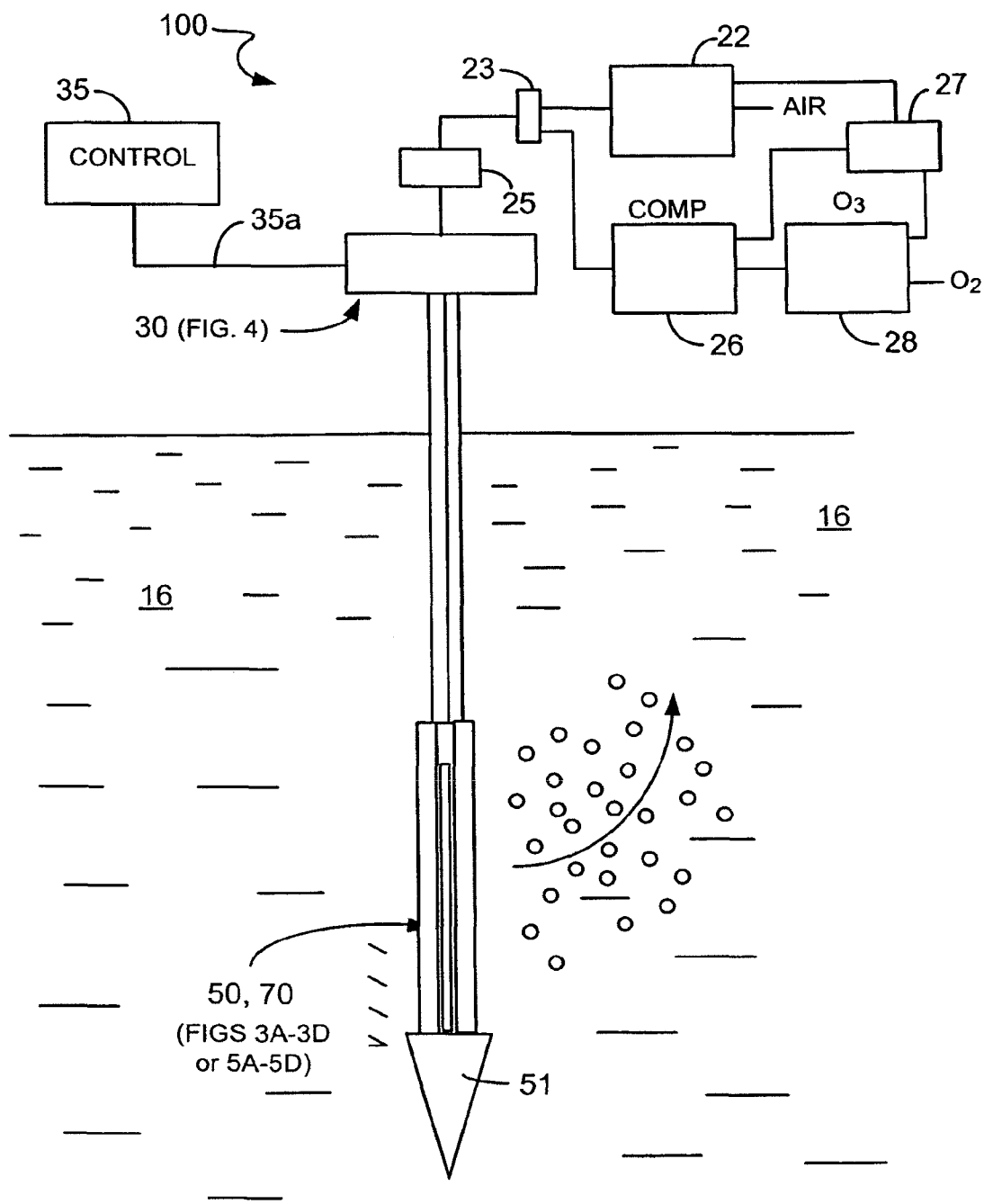

Referring now to FIG. 1B, an alternative sparging arrangement 100 for treating plumes, sources, deposits or occurrences of contaminants, is shown. The arrangement 100 includes one or more directional microporous diffusers 50, 70 (discussed in FIGS. 3A-3C and 5A-5C, respectively) disposed directly through a surrounding ground/aquifer region 16. As shown in FIG. 1B, the directional microporous diffusers 50, 70 are of a type that has a pointed member 51 on an end thereof to allow the pointed member to be driven or injected into the ground without the need for a well or casing as in FIG. 1A.

The arrangement 100 also includes the first air compressor/pump 22, the compressor/pump control mechanism 27, two port mixing valve 23, the second pump 26, ozone generator 28 and so forth as discussed above. The mixing valve 23 is coupled via a check valve 25 to an inlet port of a solenoid-controlled valve 30 controller via the control arrangement 35, as also discussed above.

In either arrangement 10 or 100, the outlet ports of the solenoid-controlled valve 30 are controlled by solenoids that selectively open and close the outlet ports 32a-32d permitting fluid to escape from one or more of the outlet ports 32a-32d. The outlet ports 32a-32d are coupled to feed lines 33 generally that are coupled to inlet fittings on a cap of the directional microporous diffuser 50, 70. The directional microporous diffuser 50, 70 allows microbubbles to be directed in selected directions into a surrounding soil formation 16, as discussed below.

In the embodiment described, a gas stream of ozone and air is delivered to the directional microporous diffuser 50, 70. Other fluid streams could be used including, air, air enhanced with oxygen, a gas and liquid, e.g., hydrogen peroxide, air/ozone enhanced with hydrogen peroxide, or a hydro peroxide and so forth.

In the illustrated embodiment, microbubbles of air and ozone exit from walls of the directional microporous diffuser 50, 70. The microbubbles of air/ozone affect substantial removal of below-mentioned or similar types of contaminants. The arrangement 10 can also include a pump (not shown) that supplies nutrients such as catalyst agents including iron containing compounds such as iron silicates or palladium containing compounds such as palladized carbon. In addition, other materials such as platinum may also be used.

Figure 1C:
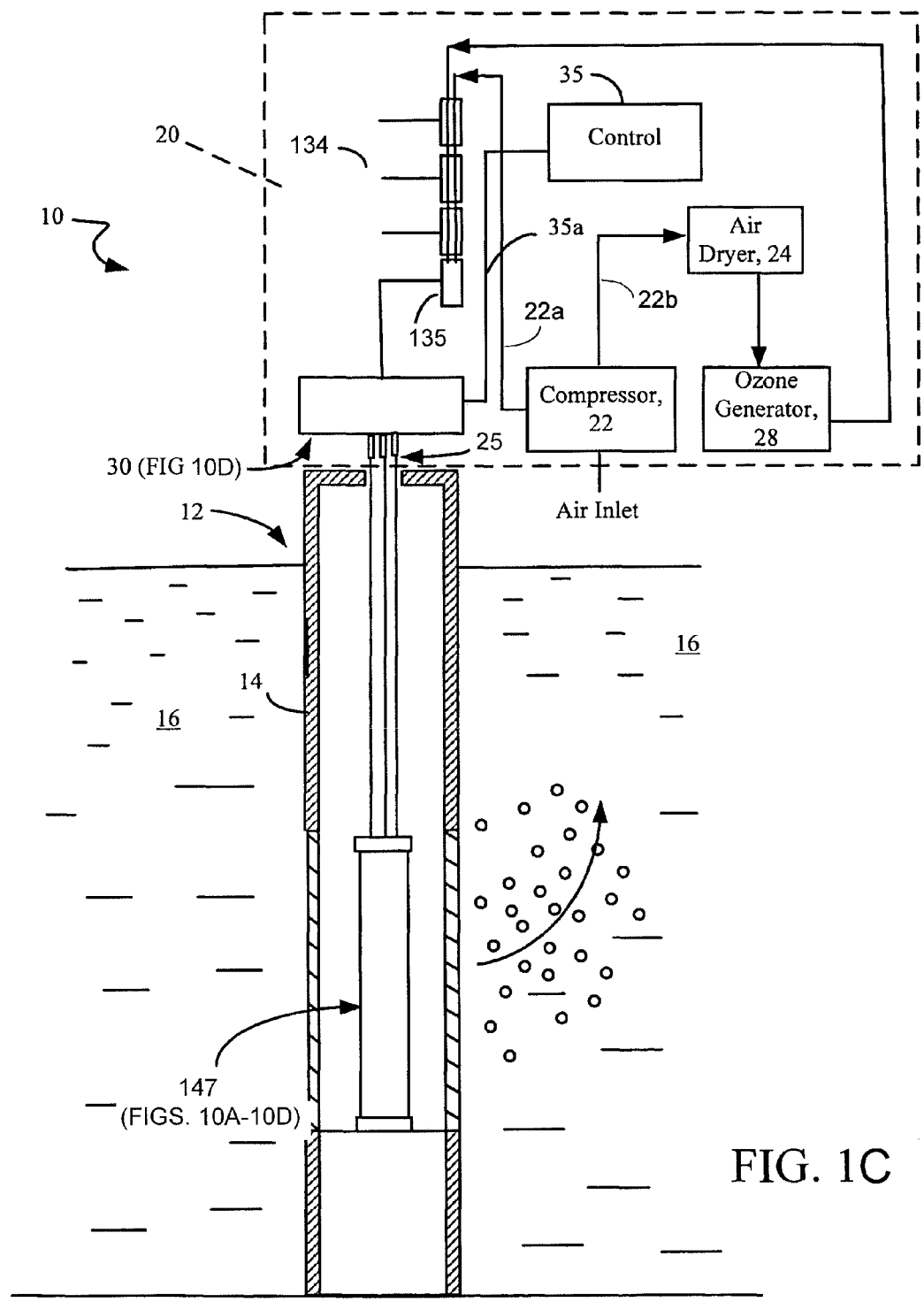

Referring now to FIG. 1C, sparging arrangement 101 for treating plumes, sources, deposits or occurrences of contaminants, is shown. Arrangement 101 is disposed in well 12 that has casing 14 with inlet screen 14a and outlet screen 14b to promote a re-circulation of water into casing 14 and through surrounding ground/aquifer region 16. Casing 14 supports the ground about well 12. Disposed through casing 14 are one or more directional microporous diffusers 147 (discussed in FIGS. 10A-10D). Other arrangements are possible. For example, there need not be a recirculation arrangement.

Arrangement 101 also includes mechanism 20 to deliver treatment fluids. Mechanism 20 includes first compressor 22 and compressor control mechanism 27 [not in drawing]. Compressor 22 has a first outlet to feed, via line 22a, a first fluid, e.g., air into manifold 134 comprised of three port solenoid controlled mixing valves 135. Compressor 22 includes a second outlet that is coupled, via line 22b to a second source, e.g., ozone generator 28 to feed ozone ($O_3$) to solenoid 134.

Three port solenoid controlled mixing valve 135 is coupled to an inlet port of solenoid-controlled valve 30. The outlets of solenoid-controlled valve 30 are coupled to lines 33 via check valves 25.

The line 22b coupled between the compressor 22 and the ozone generator 28 allows air to enter the ozone generator directly rather than pulling it under siphon.

As shown in FIG. 10D, solenoid valve 30 has a common inlet port 31 and here four branch or outlet ports 32a-32d. Control arrangement 35 controls solenoid-controlled valve 30. Control arrangement 35 can be a series of switches to actuate the solenoids, via lines 35a, or could be more complicated schemes. The gas mixture from central mixing valve 134 is distributable to each of the outlet ports 32a-32d of solenoid-controlled valve 30.

Directional microporous diffuser 147 is fitted tightly inside casing 14 and in some embodiments casing 14 itself can be partitioned (not shown). For the embodiments where the casing is partitioned, directional microporous diffuser 147 is aligned in casing 14 such that quadrants in directional microporous diffuser 147 are aligned with quadrants in casing 14. In some embodiments, packing material, e.g., sand may be disposed around directional microporous diffuser 147. In other embodiments, grooves and rails (not shown) can be provided on casing 14 and directional microporous diffuser 147 respectively, to allow directional microporous diffuser 147 to slide down casing 14 in alignment with partitions in casing 14. The grooves and rails (not shown) in addition to providing alignment also provide an inherent isolation of the quadrants of directional microporous diffuser 147 when inserted in casing 14.

A non-partitioned microporous diffuser can enlarge its radius of influence (ROI) by placing the microporous diffuser deeper within an aquifer, e.g., a substantial distance below the contaminants. However, this approach dilutes the effectiveness of such a microporous diffuser since the oxidant gas emitted from the non-partitioned microporous diffuser travels vertically for some distance in order to reach the contaminants. Along the way some of the oxidant can dissolve or is absorbed or otherwise become ineffective. Directional microporous diffuser 147 provides a mechanism that can cover broad lateral areas while staying close to contaminated groundwater zones.

Figure 1D:
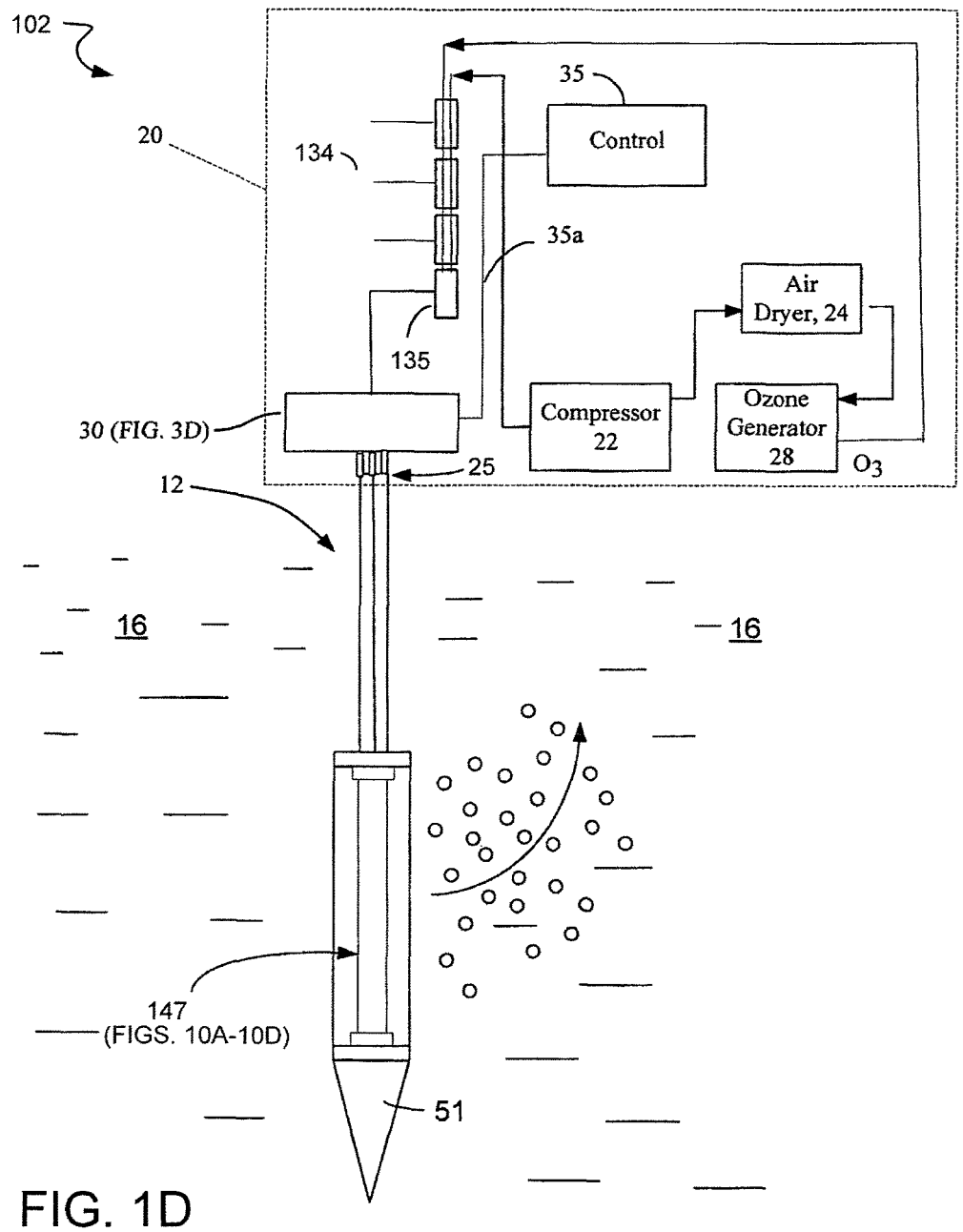

Referring now to FIG. 1D, an alternative sparging arrangement 102 for treating plumes, sources, deposits or occurrences of contaminants, is shown. Arrangement 102 includes one or more directional microporous diffusers 147 (discussed in FIGS. 10A-10C) disposed directly through surrounding ground/aquifer region 16. As shown in FIG. 1D, directional microporous diffusers 50 are of a type that has a pointed member 51 on an end thereof to allow the pointed member to be driven or injected into the ground without the need for a well or casing as in FIG. 1. Arrangement 102 also includes control mechanism 20 comprising compressor 22, ozone generator 28 and so forth as discussed above.

In either arrangement 10, 100, 101 or 102, the outlet ports of solenoid-controlled valve 30 are controlled by solenoids that selectively open and close outlet ports 32a-32d permitting fluid to escape from one or more of outlet ports 32a-32d. Outlet ports 32a-32d are coupled to feed lines 33 generally that are coupled to inlet fittings on a cap of directional microporous diffuser 147, 50 or 70. Directional microporous diffusers 147, 50 or 70 allow microbubbles to be directed in selected directions into surrounding soil formation 16, as discussed below.

In an embodiment described, a gas stream of ozone and air is delivered to directional microporous diffuser 147. Other fluid streams could be used including, air, air enhanced with oxygen, a gas and liquid, e.g., hydrogen peroxide, air/ozone enhanced with hydrogen peroxide, or a hydro peroxide and so forth.

In the illustrated embodiments, microbubbles of air and ozone exit from walls of directional microporous diffuser 147. The microbubbles of air/ozone affect substantial removal of below-mentioned or similar types of contaminants. Arrangement 10 can also include a pump (not shown) that supplies nutrients such as catalyst agents including iron containing compounds such as iron silicates or palladium containing compounds such as palladized carbon. In addition, other materials such as platinum may also be used.

The microbubbles promote rapid gas/gas/water reactions with volatile organic compounds in which a substrate (catalyst or enhancer) participates in, instead of solely enhancing, dissolved (aqueous) disassociation and reactions. The production of microbubbles and selection of appropriate size distribution is provided by using microporous material and a bubble chamber for optimizing gaseous exchange through high surface area to volume ratio and long residence time within the liquid to be treated. The equipment promotes the continuous production of microbubbles while minimizing coalescing or adhesion.

The injected air/ozone combination moves as a fluid into the material to be treated. The use of microencapsulated ozone enhances and promotes in-situ stripping of volatile organics and simultaneously terminates the normal reversible Henry's Law reaction. The process involves promoting simultaneous volatile organic compounds (VOC) in-situ stripping and gaseous decomposition, with moisture (water) and substrate (catalyst or enhancer). The basic chemical reaction mechanism of air/ozone encapsulated in micron-sized bubbles is further described in several of my issued patents such as U.S. Pat. No. 6,596,161 "Laminated microporous diffuser"; U.S. Pat. No. 6,582,611 "Groundwater and subsurface remediation"; U.S. Pat. No. 6,436,285 "Laminated microporous diffuser"; U.S. Pat. No. 6,312,605 "Gas-gas-water treatment for groundwater and soil remediation"; and U.S. Pat. No. 5,855,775, "Microporous diffusion apparatus" all of which are incorporated herein by reference.

The compounds commonly treated are HVOCs (halogenated volatile organic compounds), PCE, TCE, DCE, vinyl chloride (VC), EDB, petroleum compounds, aromatic ring compounds like benzene derivatives (benzene, toluene, ethylbenzene, xylenes). In the case of a halogenated volatile organic carbon compound (HVOC), PCE, gas/gas reaction of PCE to by-products of HCl, CO2 and H2O accomplishes this. In the case of petroleum products like BTEX (benzene, toluene, ethylbenzene, and xylenes), the benzene entering the bubbles reacts to decompose to CO2 and H2O.

Also, pseudo Criegee reactions with the substrate and ozone appear effective in reducing saturated olefins like trichloro alkanes (1,1,1,-TCA), carbon tetrachloride (CCl4), chloroform methyl chloride, and chlorobenzene, for instance.

Other contaminants that can be treated or removed include hydrocarbons and, in particular, volatile chlorinated hydrocarbons such as tetrachloroethene, trichloroethene, cisdichloroethene, transdichloroethene, 1-1-dichloroethene and vinyl chloride. In particular, other materials can also be removed including chloroalkanes, including 1,1,1 trichloroethane, 1,1, dichloroethane, methylene chloride, and chloroform. Also, aromatic ring compounds such as oxygenates such as O-xylene, P-xylene, naphthalene and methyltetrabutylether (MTBE), ethyltetrabutylether, and tertiaryamyltylether can be treated.

Ozone is an effective oxidant used for the breakdown of organic compounds in water treatment. The major problem in effectiveness is that ozone has a short lifetime. If ozone is mixed with sewage containing water above ground, the half-life is normally minutes. Ozone reacts quantitatively with PCE to yield breakdown products of hydrochloric acid, carbon dioxide, and water.

To offset the short life span, the ozone is injected with directional microporous diffusers, enhancing the selectiveness of action of the ozone. By encapsulating the ozone in fine bubbles, the bubbles preferentially extract a vapor phase fraction of the volatile compounds organic compounds that the bubbles encounter. With this process, a vapor phase according to a partition governed by Henry's Law, of the volatile organics are selectively pulled into the fine air-ozone bubbles. The gas that enters a small bubble of volume (4nr3) increases until reaching an asymptotic value of saturation. The ozone in the bubbles attacks the volatile organics, generally by a Criegee or Criegee-like reaction.

The following characteristics of the contaminants appear desirable for reaction:

Henry's Constant: $10^{-2}$ to $10^{-5}$ m3 atm/mol

Solubility: 10 to 20,000 mg/l

Vapor pressure: 1 to 3000 mmhg

Saturation concentration: 5 to 9000 mg/kg

The production of microbubbles and selection of appropriate size distribution are selected for optimized gas exchange through high surface area to volume ratio and long residence time within the area to be treated.

Figure 2:
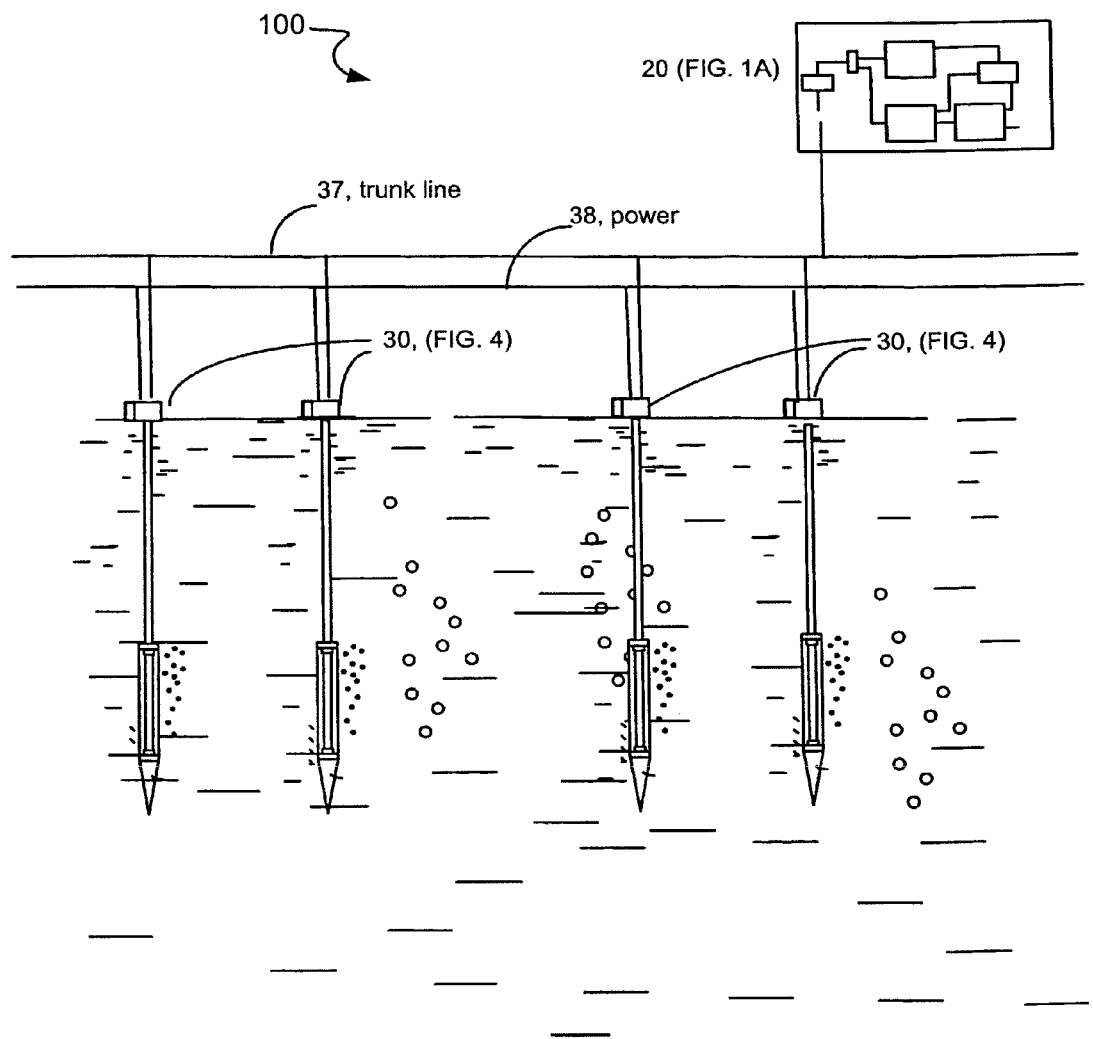
FIG. 2 is a diagrammatical view showing a multi-sparging apparatus installation.

Referring to FIG. 2, an illustrative installation of either treatment example of FIG. 1A or 1B or FIG. 8 (discussed below) is shown. In this example, multiple sparging apparatus (not numbered) here of a type described in FIG. 1B, (although others could be used) are disposed over a site. In this example, "NEMA 4" (explosion proof) boxes enclose solenoids and circuit boards 30 for remotely controlling the time and duration of the directional sparging. Such an arrangement can be used in gasoline spill areas, for example, where electrical circuits and solenoids are isolated from contact with explosive vapors. By having a separate circuit board in the well box, the well box can be placed anywhere along pressurized main 37 for gas and liquid, as discussed below. Electrical current is supplied via line 38 to operate solenoids and circuits 30. This simplifies installations that require a large number of well installations since individual gas and liquid tubing from master control 20 are not necessary to operate the wellhead.

Figure 3A:
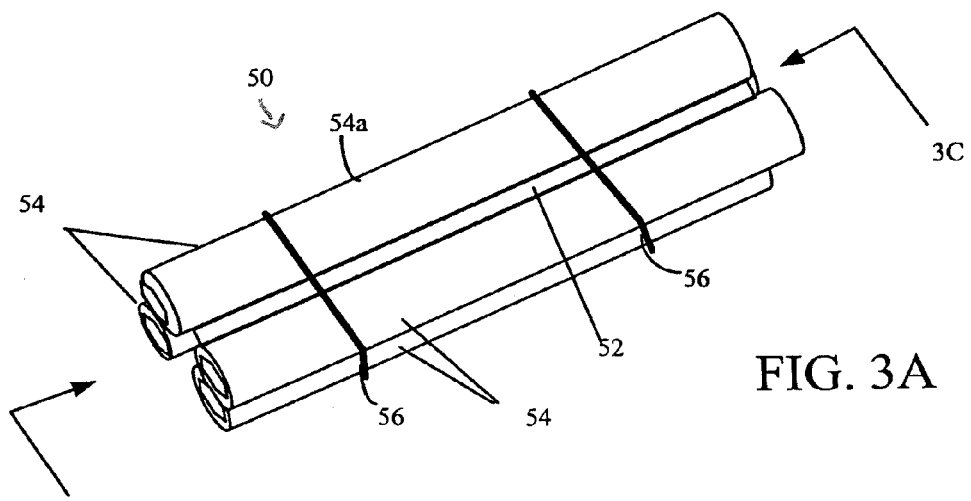
FIGS. 3A-3E are diagrams depicting details of a directional diffuser in the example shown in FIG. 1A or 1B.
Figure 3B:
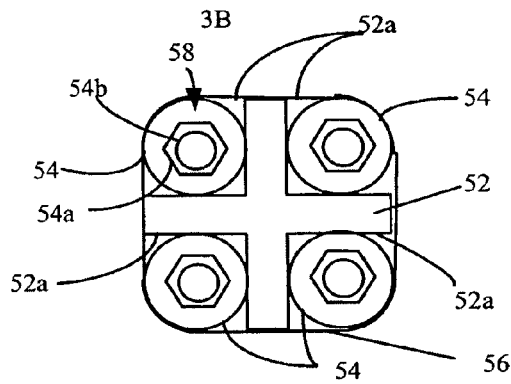
Figure 3C:
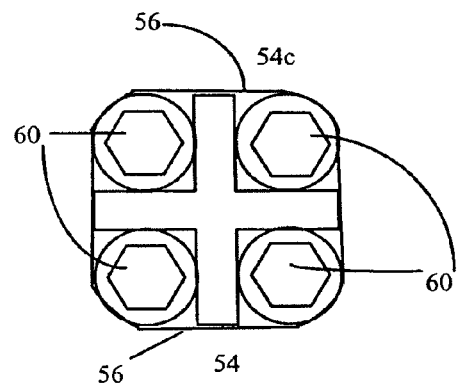

Referring now to FIGS. 3A-3C, exemplary details of a directional microporous diffuser 50 is shown. Directional microporous diffuser 50 includes a holder member 52. Holder member 52 has a plurality of compartments 52a formed by sidewalls 52b of holder member 52. The compartments correspond to the number of cylindrical tubes that will be in microporous diffuser 50. In some embodiments, sidewalls 52b have a flat surface upon which the cylindrical members rest. Here, holder member 52 is an elongated cross-like shape that will extend a substantial length of microporous diffuser 50. Microporous diffuser 50 also includes here four (4) cylindrical members or tubes 54, each having sidewall 54a comprised of a large plurality of micropores. The four (4) cylindrical members or tubes 54 provide four independent diffusers that can be controlled to sequence emission of fluids, e.g., gaseous ozone-air over e.g., 90 degree quadrants or the like depending on the number of and arrangement of cylindrical tubes 54. Other configurations of fewer or more compartments and corresponding cylindrical (or other shaped) elongated members are possible.

As shown in FIG. 3B, one end 54a of each of cylindrical members 54 has a pressure fitting 54b threaded into threaded apertures (not shown), in end 54a of cylindrical members 54 to provide fluid inlet ports 59 whereas, as shown in FIG. 3C, the other end 54b of the cylindrical members are sealed, via an end plug 60 or the like disposed in threaded (not shown) end portions 54b of cylindrical members 54. Other arrangements are possible, for instance caps having apertures can be solvent welded to the ends of the cylindrical members instead of providing threads in the cylindrical members. Bands 56, e.g., nylon bands or straps are tightly strapped around cylindrical members 54 forcing them against compartments 52a in holder member 52 and holding them in place. Other arrangements are possible.

Holder member 52 having compartments 52a within which cylindrical tubes 54 are held tightly against sidewalls 52b of holder member 52, tends to block portions of cylindrical tubes 54 from emitting gas in the form of bubbles, e.g., microbubbles, thus producing more pressure to force the bubbles from the unobstructed surfaces of cylindrical tubes 54 to direct the pattern out over a quadrant and at a higher operating pressure.

Figure 3D:
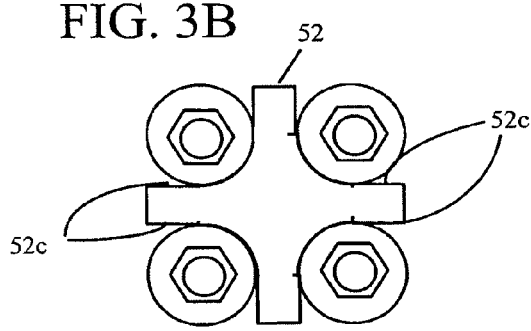

In some embodiments (FIG. 3D), sidewalls 52b have a contoured surface that would generally follow contours of sidewalls 54c of cylindrical members 54. Optionally, to increase this tendency to block gas from obstructed portions of cylindrical tubes 54, compartments 52a in holder member 52 can be supplied with a welding solvent to solvent weld cylindrical tubes 54 into compartments 52a. Then, depending on operating pressures and the strength of the welds nylon straps 56 may be omitted.

Cylindrical tubes 54 have a porosity characteristic of slot well-screen or preferably a microporosity characteristic of e.g., 200 microns or less. In some embodiments cylinders 54 are slot well screen surrounded by a sand pack, e.g., 60 mesh sand pack. Slot sizes are set out below.

| Slot Size | Inches | MM | Microns |
|---|---|---|---|
| 6 | .006 | .15 | 152 |
| 8 | .008 | .20 | 200 |
| 10 | .010 | .25 | 250 |
| 12 | .012 | .30 | 304 |
| 15 | .015 | .37 | 375 |
| 20 | .020 | .50 | 500 |
| 25 | .025 | .62 | 625 |

In other embodiments, cylinders 54 can be constructed of porous materials having microscopic openings in sidewalls 54c, as disclosed below. In other embodiments a mesh could be used. For example cylinders 54 of the diffuser can be comprised of a mesh having a mesh size in a range of at least 40 mesh and in particular in a range of, e.g., 40 to 200 mesh.

Figure 3E:
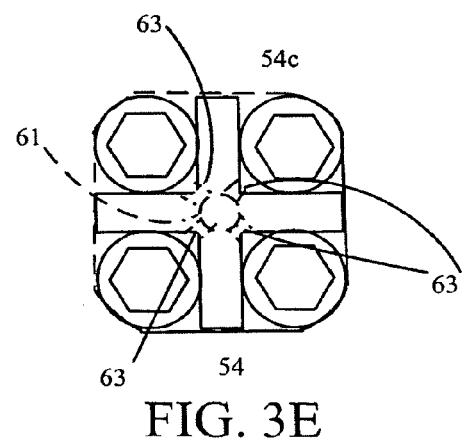

As shown in FIG. 3E, borehole 61 can be provided through holder member 32, terminated at the end 54c of the diffuser. The holder can have weep holes 63 provided in the holder at the apex of the holder into the borehole 61. A fitting (not shown) can be provided at the other end of the holder to accommodate connection to a second fluid, e.g., a liquid, as will be generally described in FIG. 8.

Figure 4A:
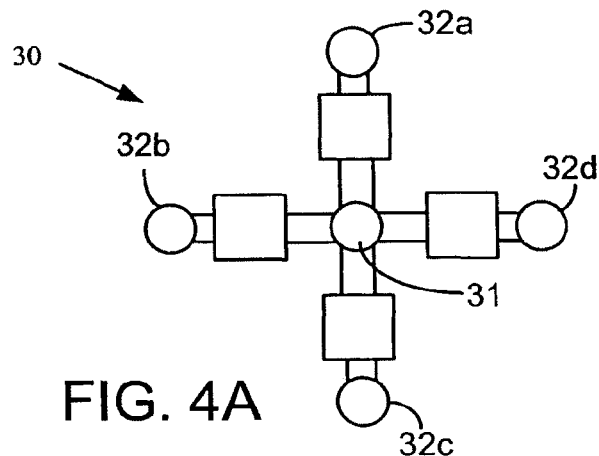
FIGS. 4A-4C are diagrams of solenoid controlled valves.
Figure 4B:
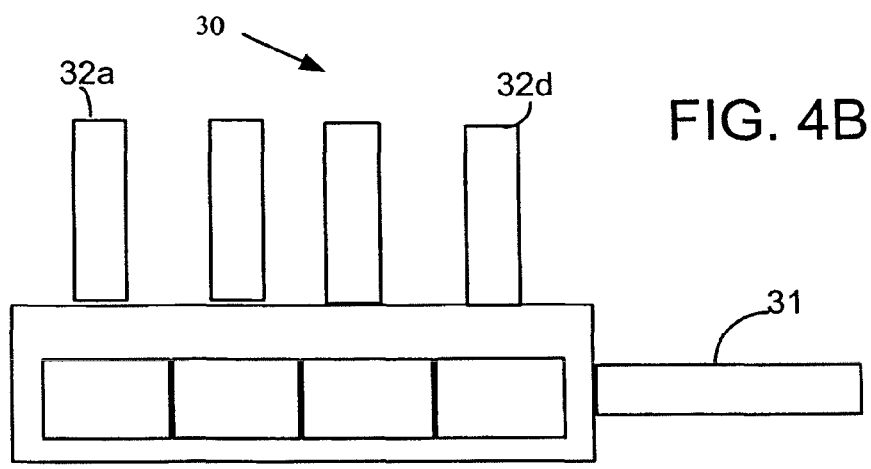
Figure 4C:
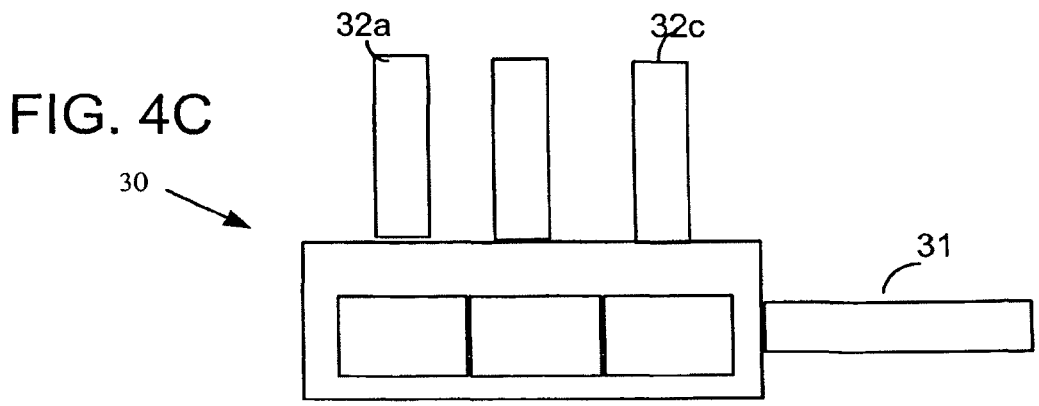

Referring now to FIGS. 4A-4C, examples solenoid-controlled valve 30 including inlet 31 and outlet ports 32a-32d are shown (only ports 32a-32c are used for valve 30 of FIG. 4C, which is used with three inlets). Not shown in detail is electrical circuitry 35 that can be used to remotely control the solenoids. When disposed in a wet soil, bubbles or microbubbles emerge from the quadrants in accordance with which one of the inlet ports 58 of directional microporous diffuser 50 receives the fluid stream from outlet ports 32a-32d of solenoid-controlled valve 30. While, cylindrical member 54 is disclosed as being cylindrical in shape, in general, the configuration could have other shapes.

As mentioned, cylindrical member 54 has a plurality of microscopic openings constructed through sidewalls 54c. The openings generally have a pore size matched to a surrounding ground formation so as to be effective for inducing gas/gas reactions with introduction of the microbubbles. Sidewalls of each of the cylindrical members can have a pore diameter in a range of 1-200 microns, preferably 1-80 microns and more preferably 0.1 to 20 microns, although 10 slot well screen could be used.

The combination of inlet fittings 58 and end plug 60 seals cylindrical tubes 54 permitting bubbles, or microbubbles, to escape only via the porous construction of the sidewalls of the cylindrical tubes.

The use of plural cylindrical tubes 54 in diffuser 50 together with the solenoid valve 30 permits a gas stream from the central feed to be directed through one, two, three or all four of the quadrants of directional microporous diffuser 50.

Thus, the pattern of the gas stream that exits from the directional microporous diffuser can be sequenced. In general, using a single quadrant at a time permits the bubbles to exit the directional microporous diffuser and have a generally elliptical shaped zone of influence in the surrounding soil formation. That is, by directing the gas stream from the feed line to one of the cylindrical tubes, the gas stream exits in the form of bubbles from unobstructed surface of the tubes providing a zone of influence that extends further in a direction perpendicular to directional microporous diffuser 50 than tangential to directional microporous diffuser 50. The treatment zone has a longer radius perpendicular to the surface of the directional microporous diffuser than the treatment zone that could be provided were the arrangement used with conventional microporous diffuser.

Solenoid-controlled valve 30 can be controlled to rotate the pattern of microbubbles emitted from directional microporous diffuser 50 by permitting microbubbles to exit from only a first quadrant, then only a second quadrant, and so forth. The control can be automated or manual. Directional microporous diffuser 50 allows fewer wells and sparging arrangements to be constructed on a site for a given sparging arrangement capacity by directing all of the capacity of the pumps and so forth into a single quadrant of a directional microporous diffuser at any one time. Directional microporous diffuser 50 can also be used to direct treatment towards especially high concentrations of contaminants while minimizing treatment materials in areas of lower contaminant concentrations. Once a first region is treated, the solenoid can be activated to close the outlet that feeds the first quadrant that treated the first region and open a second outlet of the solenoid to feed a second, different quadrant and treat a second different region.

The arrangement can also be used to treat contaminants that exist under road beds, buildings or other areas in which it is not feasible to directly drill wells. Since directional microporous diffuser 50 can direct all of the fluid supplied to the solenoid controlled value to one of cylindrical tubes 54 and though less than the entire surface area of the one cylindrical tube, the effective radius of influence is concomitantly greater than prior approaches for a given pressure and flow rate of fluid.

Referring now to FIGS. 5A-5D, exemplary details of an alternative, directional microporous diffuser 70 that allows adjusting of a shape of a bubble pattern is shown. Directional microporous diffuser 70 includes a holder member 72. Holder member 72 has a plurality of compartments 72a formed by sidewalls 72b of holder member 72 and has a plurality of attachment surfaces 72c disposed between adjacent compartments 72a. Compartments 72a correspond to the number of cylindrical tubes that will be in microporous diffuser 50 and attachment surfaces 72a provide attachment regions for holder pieces 74. Each of holder piece 74 has a base 74a that attaches to attachment surface 72c of holder 72, an opposing outer surface 74b, and sidewalls 74c having a contoured surface that would generally follow contours of cylindrical members 78. A pair of sidewalls 74c from neighboring holder pieces 74 and compartment 72a disposed between neighboring holder pieces 74 provides a composite compartment that holds cylindrical tube 78.

Bore holes 79 are disposed through holder pieces 74 aligned with tapped screw holes in holder member 74 for screws (not labeled) to attach holder pieces 74 to holder 72. Other fastening could be used. Here, holder member 72 is an elongated cross-like shape that will extend a substantial length of microporous diffuser 70.

Microporous diffuser 70 also includes here four (4) cylindrical members or tubes 78, each having a sidewall comprised of a large plurality of micropores. The four (4) cylindrical members or tubes 78 provide four, independent diffusers that can be controlled to sequence emission of fluids, e.g., gaseous ozone-air over e.g., 90 degree quadrants or the like depending on the number of and arrangement of cylindrical tubes 78. Top and sides views of directional microporous diffuser 70 are illustrated in FIGS. 5B and 5C.

Figure 5A:
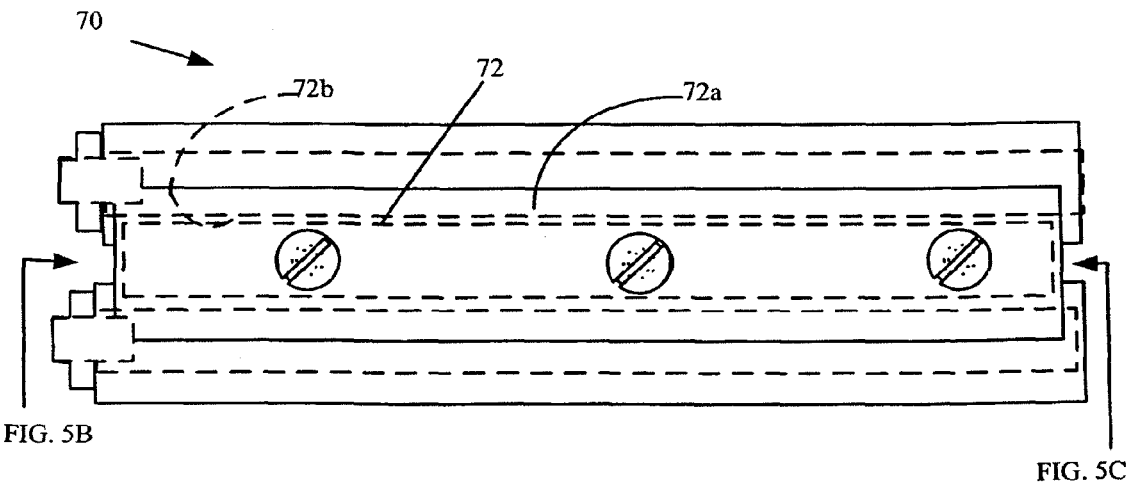
FIGS. 5A-5D are diagrams depicting details of a directional diffuser in the example shown in FIG. 1A or 1B.
Figure 5B:
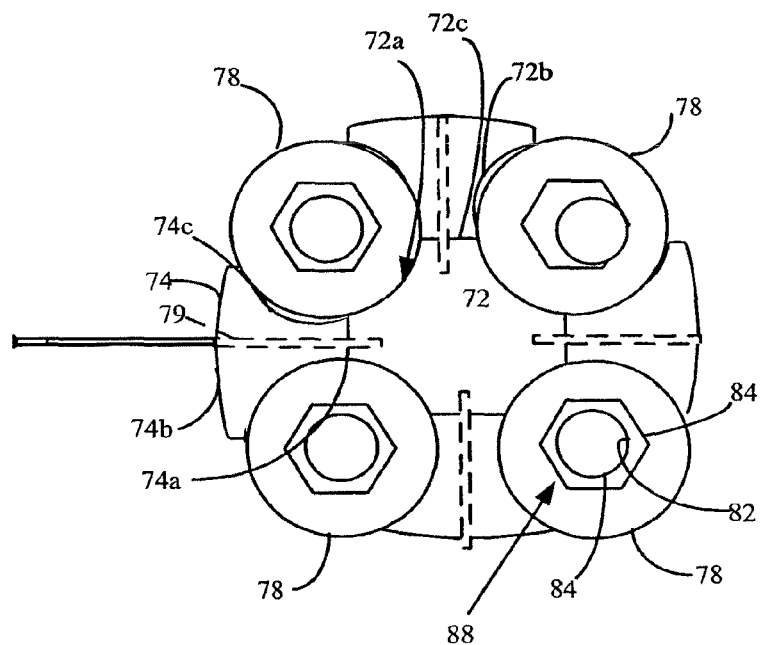
Figure 5C:
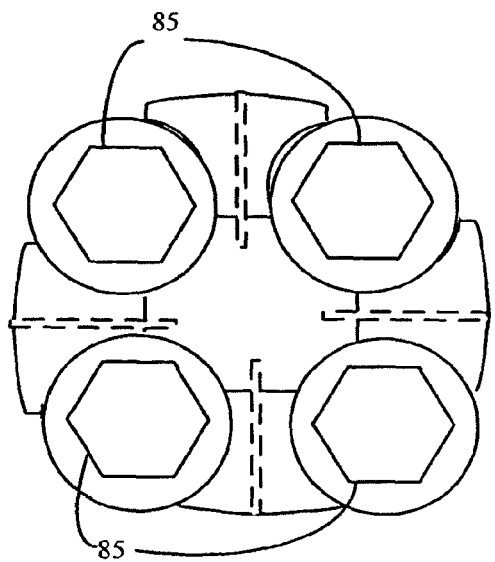

As shown in FIG. 5B, one end 78a of the cylindrical members has a pressure fitting 84, threaded into threaded apertures (not shown), in the end of cylindrical member 78 to provide fluid inlet ports 88, whereas, the other end 78b (FIG. 5C) of cylindrical members 78 are sealed, via an end plug 85 or the like. Other arrangements, e.g., welding are possible.

Holder member 72 having compartments 72a within which cylindrical tubes 78 are held tightly against sidewalls 72b of holder member 72, tends to block portions of the tubes from emitting gas in the form of bubbles, e.g., microbubbles, thus producing more pressure to force the bubbles from the unobstructed surfaces of cylindrical tubes 78 to direct the pattern out over a quadrant and at a higher operating pressure. Optionally, to increase this tendency to block gas from obstructed portions of cylindrical tubes 78, compartments 72a in holder member 72 can be supplied with a welding solvent to solvent weld cylindrical tubes 78 into compartments 72a.

As above, cylindrical members 74 have a porosity characteristic of 10 slot well screen or a microporosity characteristic of e.g., 200 microns or less. When disposed in a wet soil, bubbles or microbubbles emerge from the quadrants in accordance with which one of the inlet ports 88 of directional microporous diffuser 70 receives the fluid stream from outlet ports 32a-32d of solenoid-controlled valve 30 (FIG. 4).

While cylindrical member 78 is disclosed as being cylindrical in shape, in general, the configuration could have other shapes.

As mentioned above for cylindrical member 54 (FIGS. 3A-3C) cylindrical member 78 has a plurality of microscopic openings constructed through sidewalls 78a. The openings generally have a pore size matched to a surrounding ground formation so as to be effective for inducing gas/gas reactions with introduction of the microbubbles. Sidewalls of each of the cylindrical members can have a pore diameter in a range of 1-200 microns, preferably 1-80 microns and more preferably 0.1-20 microns, although 10 slot well screen could be used.

The combination of inlet ports 88 and end plug 85 seals cylindrical tubes 78 permitting bubbles, or microbubbles, to escape only via the porous construction of the sidewalls of the cylindrical tubes.

The use of plural cylindrical tubes 78 in diffuser 70 together with the solenoid valve 30 permits a gas stream from the central feed to be directed through one, two, three or all four of the quadrants of directional microporous diffuser 70. Also, as mentioned, holder pieces 74 allow various shaped patterns, e.g., an ellipsoidal pattern when the gas stream exits from all four cylindrical members 78 or an effectively ellipsoidal pattern, when the directional microporous diffuser 70 is sequenced. In general, using a single quadrant at a time permits the bubbles to exit the directional microporous diffuser and have a generally elliptical shaped zone of influence in the surrounding soil formation. That is, by directing all of the gas stream from the feed line to one of the cylindrical tubes, the gas stream exits in the form of bubbles from unobstructed surface of the tubes providing a zone of influence that extends further in a direction perpendicular to the directional microporous diffuser 50 than tangential to the sidewalls of directional microporous diffuser 50. The treatment zone has a longer radius perpendicular to the surface of the directional microporous diffuser than the treatment zone that could be provided were the arrangement used with conventional microporous diffuser.

Solenoid-controlled valve 30 can be controlled to sequence the pattern of microbubbles emitted from directional microporous diffuser 70 by permitting microbubbles to exit from only a first quadrant, then only a second quadrant, and so forth. The control can be automated or manual. Directional microporous diffuser 50 allows fewer wells and sparging arrangements 10 to be constructed on a site for a given sparging arrangement capacity by directing all of the capacity of the pumps and so forth into a single quadrant of a directional microporous diffuser 70 at any one time. Directional microporous diffuser 70 can also be used to direct treatment towards especially high concentrations of contaminants while minimizing treatment materials in areas of lower contaminant concentrations. Once a first region is treated, the solenoid can be activated to close the outlet that feeds the first quadrant that treated the first region and open a second outlet of the solenoid to feed a second, different quadrant and treat a second different region.

Figure 5D:
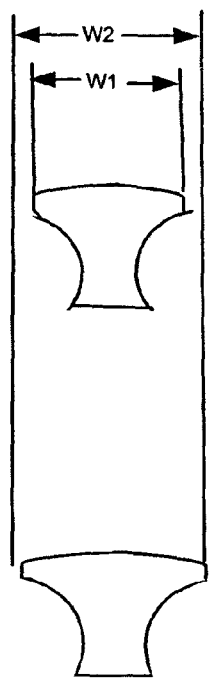

As above with diffuser 50, diffuser 70 can also be used to treat contaminants that exist under road beds, buildings or other areas in which it is not feasible to directly drill wells. Since directional microporous diffuser 50 can direct all of the fluid supplied to the solenoid controlled value to one of the cylindrical tubes 54 and though less than the entire surface area of the one cylindrical tube, the effective radius of influence is concomitantly greater than prior approaches for a given pressure and flow rate of fluid. Moreover, unlike diffuser 50, diffuser 70 can further shape the beam of fluid that exits from any particular cylindrical member 78 by judicious selection of the widths, e.g., W1 and W2 of the holder pieces 74, as shown in FIG. 5D.

Figure 6A:
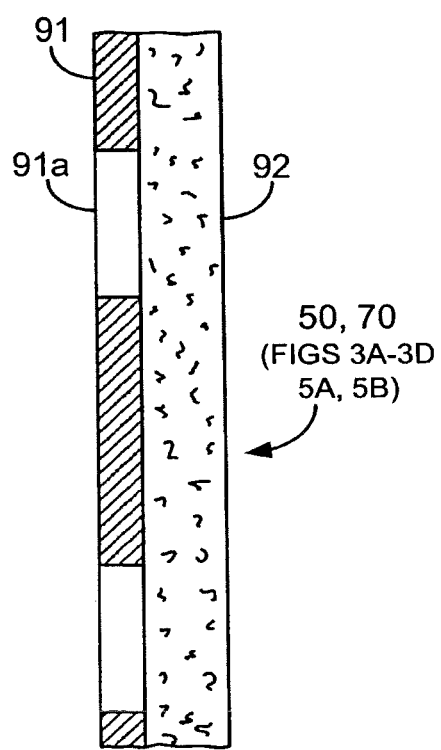
FIGS. 6A and 6B are cross-sectional views of sidewalls of the directional diffuser in the example shown in FIGS. 1A or 1B.
Figure 6B:
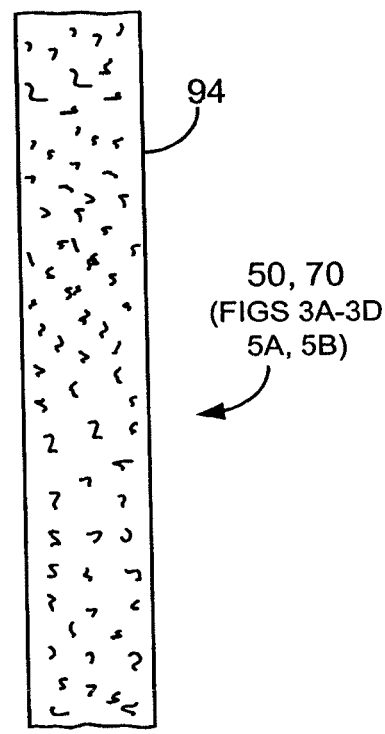

Referring now to FIGS. 6A, 6B details of sidewalls of directional microporous diffusers 50, 70 are shown. FIG. 6A shows that sidewalls of the members can be constructed from a metal or a plastic support layer 91 having large (as shown) or fine perforations 91a over which is disposed a layer of a sintered i.e., heat fused microscopic particles of plastic. The plastic can be any hydrophobic material such as polyvinylchloride, polypropylene, polyethylene, polyvinylidene, (PVDF), polytetrafluoroethylene, high-density polyethylene (HDPE) and ABS. Support layer 91 can have fine or coarse openings and can be of other types of materials. Other materials are possible such as porous stainless steel and so forth.

FIG. 6B shows an alternative arrangement 94 in which sidewalls of the members are formed of a sintered i.e., heat fused microscopic particles of plastic. The plastic can be any hydrophobic material such as polyvinylchloride, polypropylene, polyethylene, polyvinylidene, (PVDF), polytetrafluoroethylene, high-density polyethylene (HDPE) and alkylbenzylsulfonate (ABS).

The fittings (e.g., the inlets in FIGS. 3A-3D, 5A-5C) can be threaded and are attached to the inlet cap members by epoxy, heat fusion, solvent or welding with heat treatment to remove volatile solvents or other approaches. Standard threading can be used, for example, NPT (national pipe thread) or box thread e.g., (F480). The fittings are securely attached to the directional microporous diffusers in a manner that insures that the directional microporous diffusers can handle pressures that are encountered with injecting of the air/ozone.

Referring now to FIGS. 7A-7C, an alternate embodiment 70' of the directional microporous diffuser 70 is shown. The alternative, directional microporous diffuser 70' allows adjusting of a shape of a bubble pattern as with 70 (FIGS. 5A-5C) and allows a second fluid, e.g., a liquid to be dispersed along with the first fluid from the cylindrical tubes 74. Directional microporous diffuser 70' includes a holder member 72', similar in construction holder member 72 discussed above. Here, holder member 72' has, in addition to the features disclosed from holder member 72, a borehole 73 through the length of the holder member, with one end of borehole 73 having a threaded region to receive a fitting 73a. The other end of borehole 73 can be plugged or terminated inside of holder member 72. In other respects, microporous diffuser 70' is similar or the same in construction as microporous diffuser 70. The holder pieces 74' are similar in construction to those 74 of diffuser 70 (FIGS. 5A-5C); however, they include one or more liquid outlet ports 75, e.g., apertures through the thickness of the holder pieces and through the holder member terminating in borehole 73, such that liquid or another fluid that is fed through the borehole can exit from diffuser 70'.

As above with diffuser 50 and diffuser 70, diffuser 70' can also be used to treat contaminants that exist under road beds, buildings or other areas in which it is not feasible to directly drill wells. As with diffuser 70, diffuser 70' can further shape the beam of fluid that exits from any particular cylindrical member 78 by judicious selection of the widths "W" of the holder pieces 74.

The gas stream that exits from cylindrical members 78 mixes with, e.g., liquid from the outlets to coat microbubbles with a liquid coating of, e.g., water or hydrogen peroxide or a hydro peroxide. Other known liquid de-contaminant agents could be used. In general, using a single quadrant at a time permits the coated microbubbles to exit the directional microporous diffuser 70 over the sidewall surface of a single quadrant. The coated microbubbles cover a generally elliptical shaped zone of influence in the surrounding soil formation, as discussed above for directional microporous diffuser 50 70 and 70'.

Figure 8:
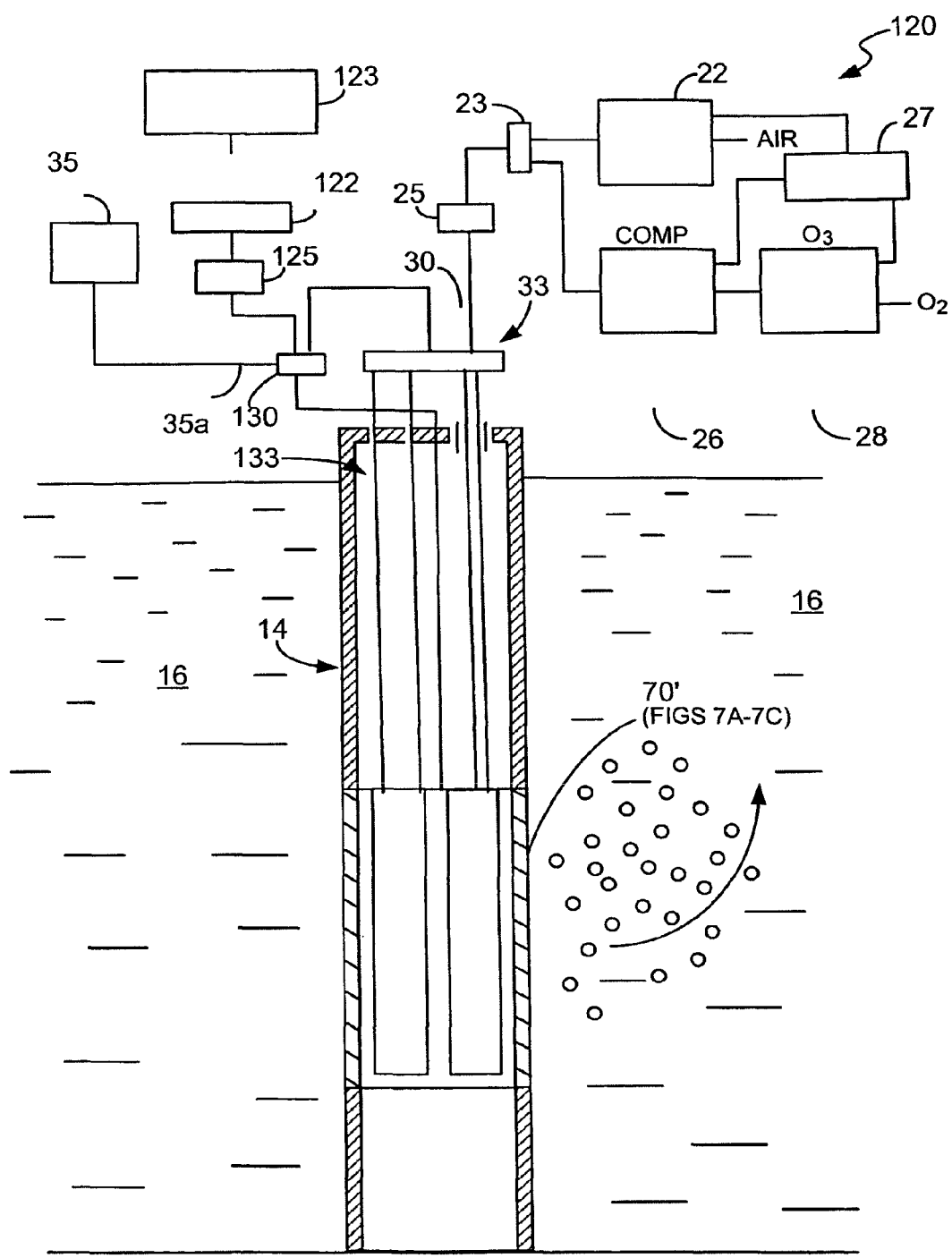
FIG. 8 is a cross-sectional view showing an alternative sparging treatment example.

Referring to FIG. 8, an example of a sparging arrangement 120 using directional microporous diffuser 70' is shown. Sparging arrangement 120 includes a source 123 (of liquid and catalysts, and/or nutrients) and a pump 122 coupled to a check valve 125 and a second solenoid-controlled valve 130. Second solenoid-controlled valve 130 has an outlet coupled to liquid feed line 133 that is coupled to inlet port 73a of directional microporous diffuser 70'. Directional microporous diffuser 70' receives liquid, catalysts, and/or nutrients, which mixes in directional microporous diffuser 70' with the gaseous stream provided via feed lines 33 to provide an emulsion of microbubbles and liquid, or catalysts etc. and preferably coated microbubbles and so forth, as in the patents mentioned above, e.g., U.S. Pat. No. 6,582,611 or U.S. Pat. No. 6,436,285 for instance. Otherwise, arrangement 120, as shown in FIG. 8, is analogous to the arrangements 10, 100 shown in FIG. 1A or 1B but for the addition of pump 122, source 123, check valve 125, feed line 133 and second solenoid-controlled valve 130. Control arrangement 35 is shown controlling both solenoid-controlled valves 30 and 130.

Figure 9A:
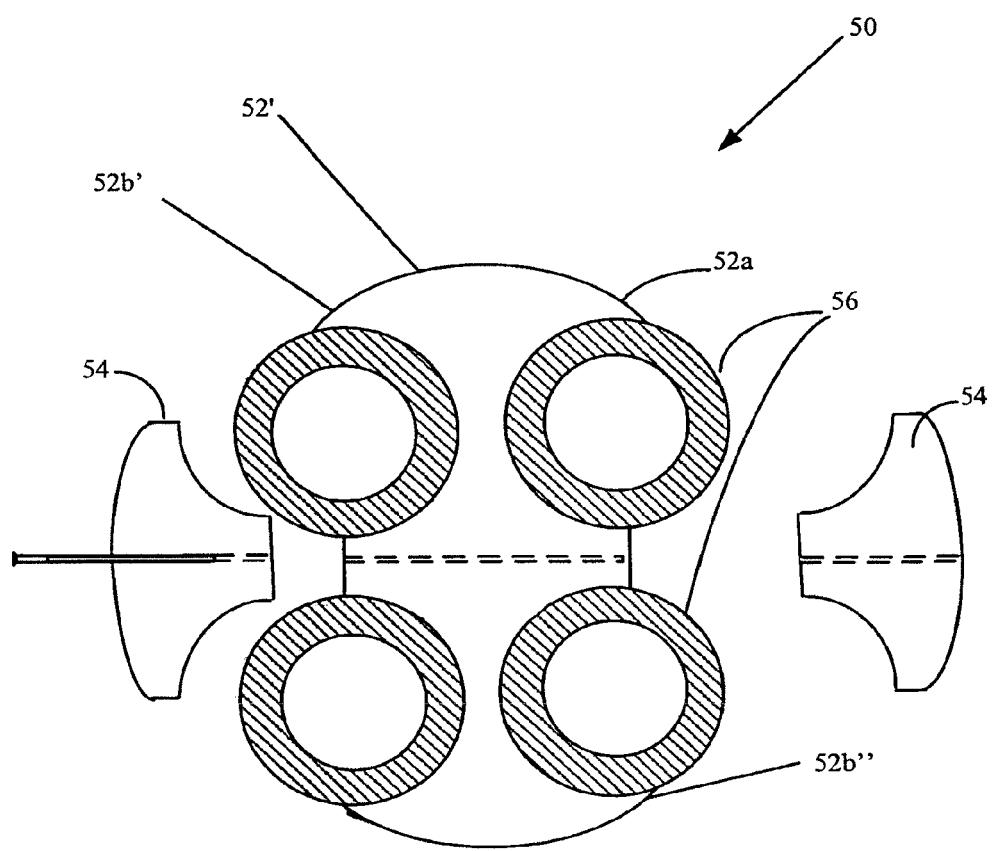
FIGS. 9A-9C are alternative configurations of the diffuser depicted in FIG. 5A-5D or 7A-7C.

Referring now to FIG. 9A, another construction 50' for the directional microporous diffuser 50 is shown. Directional microporous diffuser 50' includes a holder member 52'. Holder member 52' has four compartments 52a' formed as two pairs of adjacent compartments on opposing sidewalls 52b' 52b" of the holder member 52'. Compartments 52a' correspond to the number of cylindrical tubes that will be in microporous diffuser 50'. A pair of holder pieces 54 is used to secure cylindrical tubes 56 to the holder 52'.

Other configurations of fewer or more compartments and corresponding cylindrical (or other shaped) elongated members are possible. Other alternative arrangements are shown in FIGS. 9B and 9C.

Figures 9B, 9C:
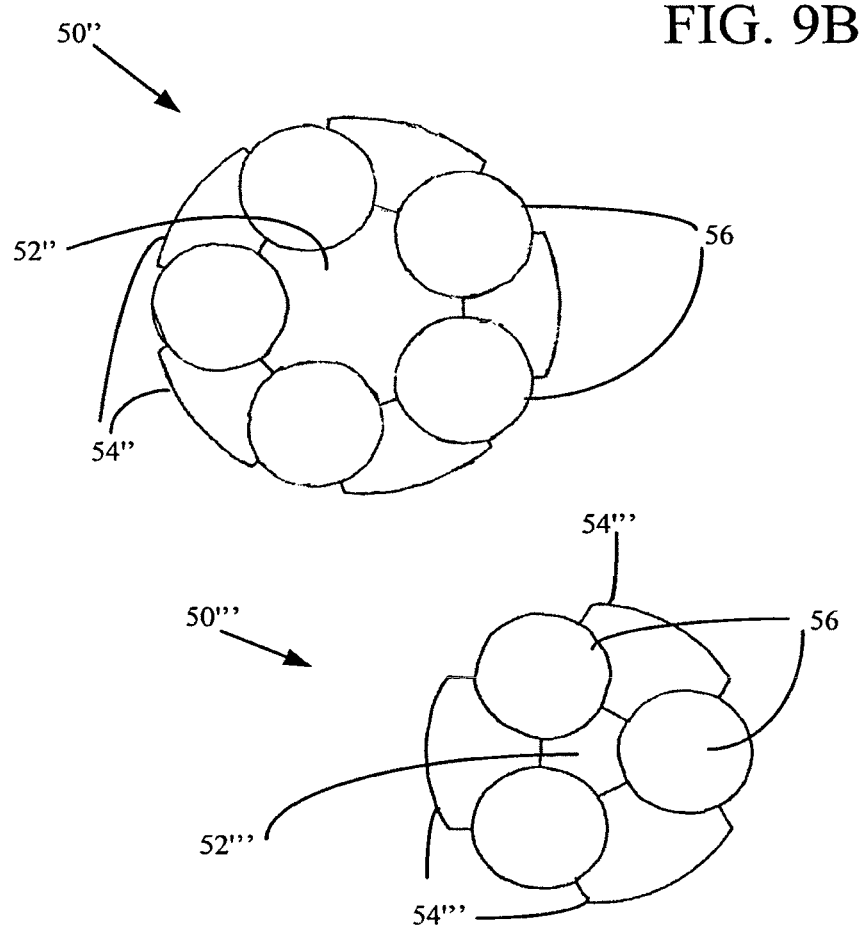

Referring now to FIG. 9B, another construction 50" for directional microporous diffuser 50 includes holder member 52". Holder member 52" has five compartments 52a". Compartments 52a" correspond to the number of cylindrical tubes that will be in microporous diffuser 50". Five holder pieces 54" are used to secure cylindrical tubes 56 to the holder 52".

Referring now to FIG. 9C, another construction 50'" for directional microporous diffuser 50 includes holder member 52'". Holder member 52'" has three compartments 52a'". Compartments 52a'" correspond to the number of cylindrical tubes that will be in microporous diffuser 50'". Three holder pieces 54" are used to secure cylindrical tubes 56 to holder 52'".

Similar arrangements with a borehole as in FIGS. 7A-7C can be provided for constructions 50'-50'".

Referring now to FIGS. 10A-10D, exemplary details of an arrangement of directional microporous diffuser 147 associated piping and solenoid-controlled valve 30 is shown. Directional microporous diffuser 147 includes a first cylindrical member 136 that provides an outer cylindrical shell for directional microporous diffuser 147. Cylindrical member 136 has a sidewall 136a comprised of a large plurality of micropores. A partitioning member 137 is coaxially disposed within cylindrical member 136 and generally affixed, e.g., bonded or otherwise affixed to the inner portions of sidewall 136a by e.g., ridges and groves. Alternatively, partitioning member 137 is formed with cylindrical member 136 by being extruded with the cylindrical member, and so forth. Partitioning member 137, as illustrated, is comprised of two planar members that intersect each other at the center of the members, and which divides cylindrical member 136 into four, mutually isolated interior chambers 137a-137d along the length of member 137, and which is particularly shown in the views of FIGS. 10B and 10C. Other configurations of fewer or more isolated chambers are possible.

Partitioning member 137 permits microbubbles to emerge from the surface of directional microporous diffuser 147 over four, here equally sized quadrants. The microbubbles emerge from the quadrants in accordance with which on the inlet ports 138a-138d of directional microporous diffuser 147 receives the fluid stream from outlet ports 32a-32d of solenoid-controlled valve 30. FIG. 10D shows in pictorial detail solenoid-controlled valve 30 including inlet 31 and the outlet ports 32a-32d.

Proximate ends of the cylindrical members 136 are coupled to inlet ports generally denoted as 138a. Inlet ports 138a are supported on an inlet cap 138 that seals one end of cylindrical member 136. Inlet ports 138a are arranged in relation to four mutually isolated chambers 137a-137d provided within directional microporous diffuser 147 such that the inlet ports 138a allow a fluid delivered to inlet ports 138a to enter the respective chamber in the interior of the directional microporous diffuser 147. In one embodiment, the fluid delivered to inlet ports 138a is a mixture of air and ozone, as described above. At the opposite end of directional microporous diffuser 147, end cap 145 covers the second, distal end of cylindrical member 136. Together end cap 145 and cap 138 seal the ends of directional microporous diffuser 147.

While cylindrical member 136 is disclosed as being cylindrical in shape, in general, the configuration could have other shapes. Partitioning member 137 can extend beyond the length of cylindrical member 136 such that ends of partitioning member 137 sit in grooves provided in caps 138 and 145.

Cylindrical member 136 has a plurality of microscopic openings constructed through sidewalls 136a. The openings generally have a pore sizes matched to a surrounding ground formation so as to be effective for inducing gas/gas reactions with introduction of the microbubbles. Sidewalls of each of the cylindrical members can have a pore diameter in a range of 1-200 microns, preferably 1-80 microns and more preferably 1-20 microns. The combination of inlet cap 138 and end cap 145 seals directional microporous diffuser 147 permitting the microbubbles to escape only via the porous construction of the sidewalls of the directional microporous diffusers.

Partition member 137 in directional microporous diffuser 147 together with solenoid valve 30 permits a gas stream from the central feed to be directed through one, two, three or all four of the quadrants of directional microporous diffuser 147. Thus, the pattern of the gas stream that exits from the directional microporous diffuser can be adjusted. In general, using a single quadrant at a time permits the bubbles to exit the directional microporous diffuser and have a generally elliptical shaped zone of influence in the surrounding soil formation, that is the zone of influence will extend further in a direction perpendicular from directional microporous diffuser 147 that tangentially from the sidewalls of directional microporous diffuser 147. The treatment zone has a longer radius perpendicular to the surface of the directional microporous diffuser than the treatment zone that could be provided were the arrangement used with a non partitioned, non directional microporous diffuser.

Solenoid-controlled valve 30 can be controlled to rotate the pattern of microbubbles emitted from directional microporous diffuser 147 by permitting microbubbles to exit from only a first quadrant, then only a second quadrant, and so forth. The control can be automated or manual. Directional microporous diffuser 147 allows fewer wells and sparging arrangements 10 to be constructed on a site for a given sparging arrangement capacity by directing all of the capacity of the pumps and so forth into a single quadrant of a directional microporous diffuser at any one time. Directional microporous diffuser 147 can also be used to direct treatment towards especially high concentrations of contaminants while minimizing treatment materials in areas of lower contaminant concentrations. Once a first region is treated, the solenoid can be activated to close the outlet that feeds the first quadrant that treated the first region and open a second outlet of the solenoid to feed a second, different quadrant and treat a second different region.

Figure 11A:
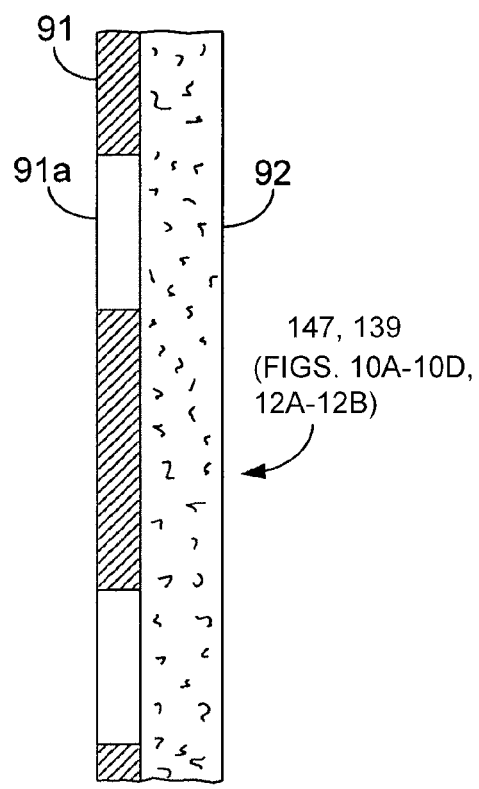
FIGS. 11A and 11B are cross-sectional view of sidewalls of the directional microporous diffusers of FIGS. 10A-10D and 12A-12B showing exemplary construction details.
Figure 11B:
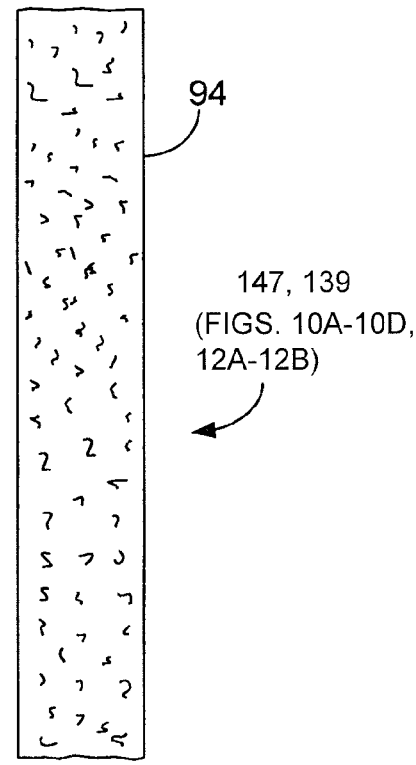

Referring now to FIGS. 11A, 11B details of sidewalls of directional microporous diffusers 147, 139 are shown. FIG. 11A shows that sidewalls of the members can be constructed from a metal or a plastic support layer 91 having large (as shown) or fine perforations 91a over which is disposed a layer of a sintered i.e., heat fused microscopic particles of plastic. The plastic can be any hydrophobic material such as polyvinylchloride, polypropylene, polyethylene, polytetrafluoroethylene, high-density polyethylene (HDPE) and ABS. Support layer 91 can have fine or coarse openings and can be of other types of materials. Other materials are possible such as porous stainless steel and so forth.

FIG. 11B shows an alternative arrangement 94 in which sidewalls of the members are formed of a sintered i.e., heat fused microscopic particles of plastic. The plastic can be any hydrophobic material such as polyvinylchloride, polypropylene, polyethylene, polytetrafluoroethylene, high-density polyethylene (HDPE) and alkylbenzylsulfonate (ABS).

The fittings (e.g., the inlets in FIGS. 10A-10D) can be threaded and are attached to the inlet cap members by epoxy, heat fusion, solvent or welding with heat treatment to remove volatile solvents or other approaches. Standard threading can be used for example NPT (national pipe thread) or box thread e.g., (F480). The fittings are securely attached to the directional microporous diffusers in a manner that insures that the directional microporous diffusers can handle pressures that are encountered with injecting of the air/ozone.

Figure 12A:
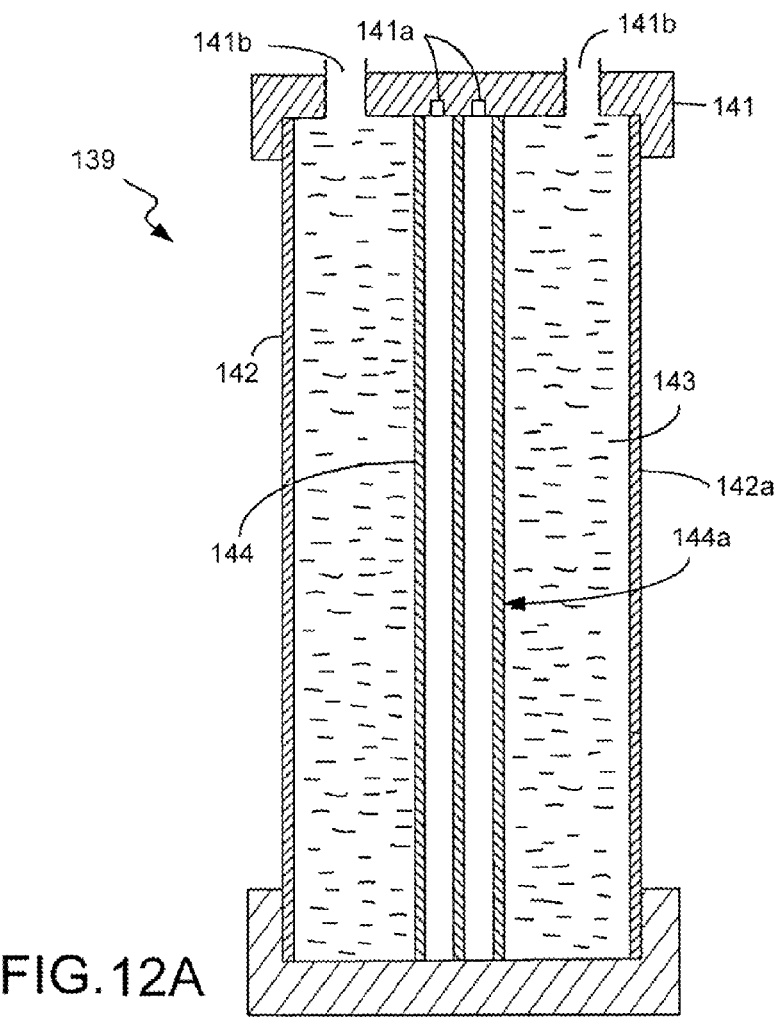
FIGS. 12A and 12B are longitudinal cross-section and plan cross-sectional views of a directional microporous diffuser useful in the arrangement of FIGS. 1C and 1D.
Figure 12B:
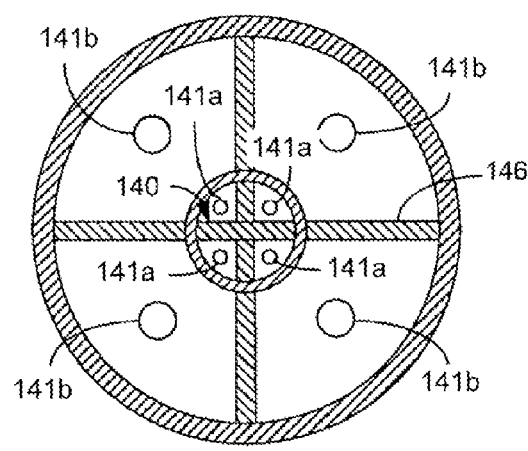

Referring now to FIGS. 12A and 12B, an alternate embodiment 139 of directional microporous diffuser 139 is shown. Directional microporous diffuser 139 includes outer cylindrical member 142 having sidewall 142a within which is disposed in inner cylindrical member 144 having sidewall 144a. Inner cylindrical member 144 is spaced from sidewall 142a of the outer cylindrical member. The space 143 between inner and outer cylindrical members 142, 144 is filled with a packing material comprised of glass beads or silica particles (silicon dioxide) or porous plastic that is hydrophilic. A second partitioning member 140 is disposed within inner cylindrical member 144 and first partitioning member 146 generally aligned with second partitioning member 140 is disposed between inner portions of sidewall 142a of outer cylindrical member 142 and outer portions of sidewall 144a of inner cylindrical member 144. Space 143 is coupled to input ports generally 141b.

Directional microporous diffuser 139 has inner cylindrical member 144 disposed coaxial or concentric to cylindrical member 142. Sidewalls of each of the cylindrical members 144, 142 can have a pore diameter in a range of 1-200 microns, preferably 1-50 microns and more preferably 5-20 microns. A proximate end of inner cylindrical member 144 is coupled to inlet ports 141a, which are fed an air ozone mixture from first solenoid valve 30. Directional microporous diffuser also includes an end cap 146, which secures distal ends of cylinders 142 and 144. The combination of the inlet cap 141 and end cap 146 seals directional microporous diffuser 139 permitting liquid and gas to escape by the porous construction of sidewalls of the directional microporous diffusers.

Partition members 140 in directional microporous diffuser 139 together with solenoid valve 30 permit a gas stream to be directed through one, two, three or all four of the quadrants of inner member 144. The gas stream that exits from inner member 144 enters outer quadrants between the inner and outer members where it mixes with, e.g., liquid to coat the microbubbles with a liquid coating of, e.g., water or hydrogen peroxide or a hydro peroxide. In general, using a single quadrant at a time permits the coated microbubbles to exit directional microporous diffuser 139 over the sidewall surface of a single quadrant. The coated microbubbles cover a generally elliptical shaped zone of influence in the surrounding soil formation, as discussed above for directional microporous diffuser 147.

In some embodiments of microporous diffuser 139, one of the partitioning members can be eliminated to simplify construction of microporous diffuser 139.

Figure 13:
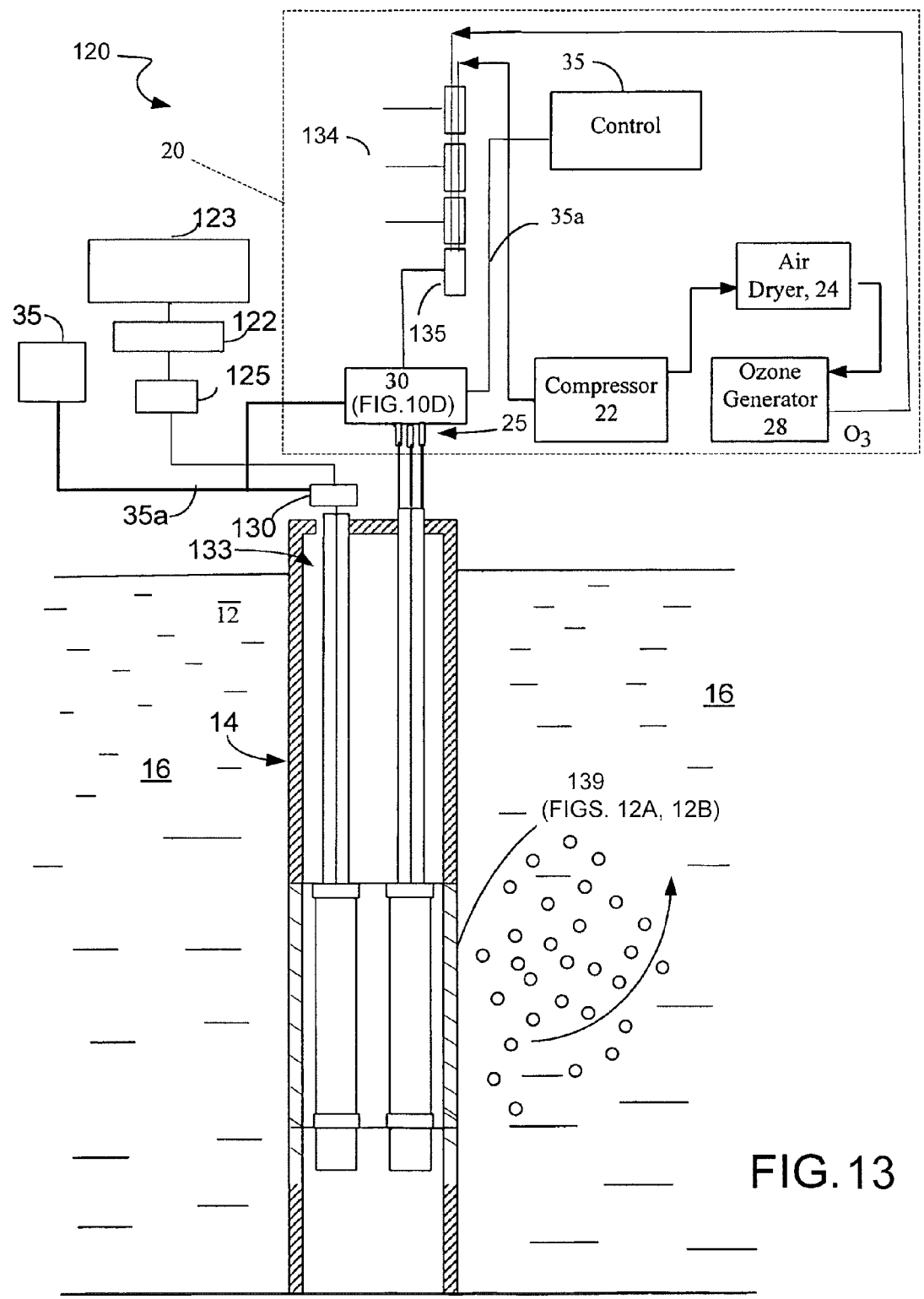
FIG. 13 is a cross-sectional view showing a sparging treatment example.

Referring to FIG. 13 an example of sparging arrangement 120 using directional microporous diffuser 139 is shown. Sparging arrangement 120 includes a source 123 (of liquid and catalysts, and/or nutrients) and a pump 122 coupled to a check valve 125 and a second solenoid-controlled valve 130. Second solenoid-controlled valve 130 has outlets (not numbered) coupled to a second set of feed lines 133 that are coupled to input ports 141b of directional microporous diffuser 139. Directional microporous diffuser 139 receives liquid, catalysts, and/or nutrients, which mixes in directional microporous diffuser 139 with the gaseous stream provided via feed lines 33 to effect coated microbubbles and so forth, as in the patents mentioned above, e.g., U.S. Pat. No. 6,582,611 or U.S. Pat. No. 6,436,285 for instance.

Otherwise, arrangement 120, as shown in FIG. 13, is analogous to arrangements 10, 100 shown in FIG. 1 or 2 but for the addition of pump 122, source 123, check valve 125, second set of feed lines 133 and second solenoid-controlled valve 130 and thus also includes mechanism 20. Control arrangement 35 is shown controlling both solenoid-controlled valves 30 and 130.

A number of embodiments of the invention have been described. Nevertheless, it will be understood that various modifications may be made without departing from the spirit and scope of the invention.

What is claimed is:

1. A directional microporous diffuser comprising:
   a first elongated member including at least one sidewall having a plurality of microscopic openings, said sidewall defining an interior hollow portion of said member;
   a second elongated member having a second sidewall having a plurality of microscopic openings, said second elongated member being disposed through the interior hollow portion of said first elongated member;
   two or more first partitioning members disposed inside and along a length of the first elongated member to provide a first plurality of isolated chambers;
   a second partitioning member disposed inside and along a length of the second elongated member to provide a second plurality of isolated chambers;
   an end cap to seal a first end of the directional microporous diffuser; and
   an inlet cap disposed at a second end of the directional microporous diffuser for receiving inlet fittings.

2. The directional microporous diffuser of claim 1 wherein a region defined between the first and second elongated members of the directional microporous diffuser is filled with a catalyst suspension material.

3. The directional microporous diffuser of claim 1 wherein the two or more first partitioning members and the second partitioning member are aligned to provide the first plurality of isolated chambers aligned to the second plurality of isolated chambers.

4. The directional microporous diffuser of claim 1, further comprising:
   multiple inlet fittings supported on the inlet cap, a first portion of the multiple inlet fittings in fluid communication with the first plurality of isolated chambers, and
   a second portion of the multiple inlet fittings in fluid communication with the second plurality of isolated chambers.

5. The directional microporous diffuser of claim 1, comprising three or more first partitioning members disposed inside and along the length of the first elongated member to provide the first plurality of isolated chambers.

6. The directional microporous diffuser of claim 5, comprising four first partitioning members disposed inside and along the length of the first elongated member to provide the first plurality of isolated chambers.

7. The directional microporous diffuser of claim 1, comprising two second partitioning members disposed inside and along the length of the second elongated member to provide the second plurality of isolated chambers.

8. The directional microporous diffuser of claim 1, wherein the first elongated member is a cylinder.

9. The directional microporous diffuser of claim 1, wherein the second elongated member is a cylinder.

10. The directional microporous diffuser of claim 1, wherein the plurality of microscopic openings of the sidewall of the first elongated member have pore diameters selected from the range of 1 to 200 µm.

11. The directional microporous diffuser of claim 1, wherein the plurality of microscopic openings of the sidewall of the first elongated member have pore diameters selected from the range of 1 to 50 µm.

12. The directional microporous diffuser of claim 1, wherein the plurality of microscopic openings of the sidewall of the first elongated member have pore diameters selected from the range of 5 to 20 µm.

13. The directional microporous diffuser of claim 1, wherein the plurality of microscopic openings of the sidewall of the second elongated member have pore diameters selected from the range of 1 to 200 µm.

14. The directional microporous diffuser of claim 1, wherein the plurality of microscopic openings of the sidewall of the second elongated member have pore diameters selected from the range of 1 to 50 µm.

15. The directional microporous diffuser of claim 1, wherein the plurality of microscopic openings of the sidewall of the second elongated member have pore diameters selected from the range of 5 to 20 µm.

16. The directional microporous diffuser of claim 1, comprising a sparging arrangement including a source of liquids and catalysts and/or nutrients, the source positioned in fluid communication with the first plurality of isolated chambers.

17. The directional microporous diffuser of claim 1, further comprising a gas stream directed through one or more of the second plurality of isolated chambers.

\* \* \* \* \*

UNITED STATES PATENT AND TRADEMARK OFFICE
CERTIFICATE OF CORRECTION

| | | |
|---|---|---|
| PATENT NO. | : 8,771,507 B2 | Page 1 of 1 |
| APPLICATION NO. | : 12/534662 | |
| DATED | : July 8, 2014 | |
| INVENTOR(S) | : William B. Kerfoot | |

It is certified that error appears in the above-identified patent and that said Letters Patent is hereby corrected as shown below:

IN THE SPECIFICATION:

Column 4, Line 52, "an hollow" should read --a hollow--.
Column 4, Line 61, "correspond portions" should read --corresponding portions--.
Column 6, Line 23, "microporous diffuser" should read --microporous diffuser.--.
Column 13, Line 39, "controlled value" should read --controlled valve--.
Column 15, Line 29, "solenoid controlled value" should read --solenoid controlled valve--.
Column 18, Line 6, "have a pore sizes match" should read --have pore sizes match--.
Column 18, Line 26, "that tangentially" should read --than tangentially--.

Signed and Sealed this
Thirtieth Day of December, 2014

Michelle K. Lee
*Deputy Director of the United States Patent and Trademark Office*